(12) United States Patent
Forsberg et al.

(10) Patent No.: US 11,494,716 B2
(45) Date of Patent: Nov. 8, 2022

(54) SYSTEM, APPARATUS, AND METHOD FOR DETERMINING A SURFACING OR CUTTING CONSUMABLE PRODUCTS

(71) Applicant: HUSQVARNA AB, Huskvarna (SE)

(72) Inventors: Maria Forsberg, Lindome (SE); Johan Wallin, Onsala (SE); Michel Hubermont, Archennes (BE); Alan Dupont, Brussels (BE); Martin Renneson, Brussels (BE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 16/842,582

(22) Filed: Apr. 7, 2020

(65) Prior Publication Data

US 2021/0312363 A1 Oct. 7, 2021

(51) Int. Cl.
*G06Q 10/06* (2012.01)
*G05B 19/18* (2006.01)
*G06Q 10/08* (2012.01)
*G06Q 30/02* (2012.01)
(Continued)

(52) U.S. Cl.
CPC ..... *G06Q 10/06313* (2013.01); *G05B 19/182* (2013.01); *G06Q 10/06315* (2013.01); *G06Q 10/06316* (2013.01); *G06Q 10/0875* (2013.01); *G06Q 30/0205* (2013.01); *G06Q 30/0633* (2013.01); *G06Q 50/08* (2013.01); *G05B 2219/37355* (2013.01)

(58) Field of Classification Search
CPC ....... G06Q 10/06313; G06Q 10/06315; G06Q 10/06316; G06Q 10/0875; G06Q 30/0205; G06Q 30/0633; G06Q 50/08; G05B 19/182; G05B 2219/37355
See application file for complete search history.

(56) References Cited

U.S. PATENT DOCUMENTS 3,121,981 A 2/1964 Hurst
6,138,317 A * 10/2000 Holmes .................... A46B 9/02
15/180

(Continued)

FOREIGN PATENT DOCUMENTS

CN 106346379 A 1/2017
EP 2829658 A1 * 1/2015 ........... B23B 51/044
(Continued)

OTHER PUBLICATIONS

International Search Report and Written Opinion for International Application No. PCT/IB2021/052746, dated Jul. 5, 2021.

*Primary Examiner* — Romain Jeanty
(74) *Attorney, Agent, or Firm* — Burr & Forman LLP

(57) ABSTRACT

Systems, methods, and apparatuses for generating a consumable product quotation are provided. An example method may include receiving a surface status. The example method may also include determining, by processing circuitry, consumable product requirements for performing a job based on the surface status and consumable product parameters accessed in a consumable products database. The example method may also include providing the consumable product requirements for output to a user. The consumable product requirements may include types of consumable products for completing the job.

23 Claims, 13 Drawing Sheets

(51) Int. Cl.
    *G06Q 30/06*          (2012.01)
    *G06Q 50/08*          (2012.01)

(56) References Cited

U.S. PATENT DOCUMENTS

| | | | |
|---|---|---|---|
| 7,810,417 B2 * | 10/2010 | Onozuka | B23C 3/00 82/1.11 |
| 11,250,703 B2 * | 2/2022 | Grace | G07C 5/008 |
| 2002/0066600 A1 * | 6/2002 | Dvorachek | E21B 10/5673 175/413 |
| 2006/0110229 A1 * | 5/2006 | Schnell | B23C 1/20 409/182 |
| 2009/0032138 A1 * | 2/2009 | Alleman | B23Q 11/0046 144/252.1 |
| 2011/0223845 A1 | 9/2011 | Van Der Veen et al. | |
| 2014/0352106 A1 * | 12/2014 | King, Jr. | A47L 9/02 15/415.1 |
| 2016/0259341 A1 * | 9/2016 | High | H04W 4/33 |
| 2016/0375570 A1 | 12/2016 | Boeck et al. | |
| 2017/0008102 A1 * | 1/2017 | Ishikawa | B64F 5/10 |
| 2020/0030880 A1 * | 1/2020 | Nagahama | G06N 3/08 |
| 2020/0055159 A1 * | 2/2020 | Sakai | H02P 6/24 |

FOREIGN PATENT DOCUMENTS

| | | | | |
|---|---|---|---|---|
| EP | 3202537 A1 | 8/2017 | | |
| JP | 2017148874 A | 8/2017 | | |
| WO | WO-02064313 A1 * | 8/2002 | | B24B 5/04 |
| WO | 2012036026 A1 | 3/2012 | | |
| WO | 2017151498 A1 | 9/2017 | | |
| WO | 2018118596 A2 | 6/2018 | | |

\* cited by examiner

Surfacing Consumable Product Quotation
Surfacing Job ID: Job1

Date of Quotation Generated: 01/01/2030

Surface Material: Concrete
Finishing Type: Residential/Premium
Surfacing Jobsite Area: 2000 m²
Grinding Machine Model: XYZ123
Currency: X

Consumable Products

| Usage Sequence No. | Type | Description | SKU | Unit price | Starting Kit | | Full Job | |
|---|---|---|---|---|---|---|---|---|
| | | | | | Ct. | Cost | Ct. | Cost |
| 1 | Grinding | Grinding Diamond Segment 30 Grit (3 pack) | 3D30 | 100 | 6 | 600 | 24 | 2400 |
| 2 | Grinding | Grinding Diamond Segment 50 Grit (3 pack) | 3D50 | 100 | 6 | 600 | 18 | 1800 |
| 3 | Grinding | Grinding Diamond Segment 100 Grit (3 pack) | 3D1C | 100 | 3 | 300 | 6 | 600 |
| 4 | Chemical Treatment | Regrouting Bonding Additive (1 Gallon) | RBA1 | 50 | 1 | 50 | 20 | 1000 |
| 5 | Chemical Treatment | Surface Hardener (1 Gallon) | SH1 | 150 | 1 | 150 | 20 | 3000 |
| 6 | Polishing | Resin Polishing Pad 50 Grit | RP50 | 20 | 15 | 300 | 90 | 1800 |
| 7 | Polishing | Resin Polishing Pad 100 Grit | RP1C | 20 | 15 | 300 | 90 | 1800 |
| 8 | Polishing | Soft Polishing Pad 200 Grit | SP2C | 75 | 3 | 225 | 15 | 1125 |
| 9 | Polishing | Soft Polishing Pad 400 Grit | SP4C | 75 | 3 | 225 | 15 | 1125 |
| 10 | Polishing | Soft Polishing Pad 800 Grit | SP8C | 75 | 3 | 225 | 12 | 900 |
| 11 | Polishing | Soft Polishing Pad 1500 Grit | SP2C | 75 | 3 | 225 | 12 | 900 |
| 12 | Polishing | Soft Polishing Pad 3000 Grit | SP2C | 75 | 3 | 225 | 12 | 900 |
| 13 | Finishing Treatment | Sealer (1 Gallon) | SLR1 | 150 | 1 | 150 | 20 | 3000 |
| 14 | Finishing Treatment | Burnishing Pad 3000 Grit | BP3K | 75 | 3 | 225 | 12 | 900 |
| TOTAL | | | | | | 3800 | | 21250 |

FIG. 5

SYSTEM, APPARATUS, AND METHOD FOR DETERMINING A SURFACING OR CUTTING CONSUMABLE PRODUCTS

TECHNICAL FIELD

Example embodiments generally relate to jobsite analysis and, more particularly, relate to apparatuses, systems, and methods for generating consumable product requirements and quotations for a surfacing or cutting job.

BACKGROUND

Various surfacing or cutting power tools use consumable products that are affixed to a rotating member to perform the cutting or surfacing operation. A cutting operation may involve cutting into a surface and a surfacing operation may involve refinishing or resurfacing a surface. In this regard, such consumable products may degrade as the products are used, requiring replacement to continue performing a job. Use of the correct consumable product for a particular job may be important, since an incorrect consumable product, for a particular job, can lead to unnecessary cost and inefficiencies.

For example, in the context of a surfacing operation, flooring and other surfaces that are constructed of materials, such as concrete, can be subjected to a complex procedure to condition, seal, and polish the surface. The complexity of a concrete resurfacing job is a function of the numerous consumable products that are used to complete the process. Such products have a variety of different characteristics that must be selected from and applied in a very specific order to achieve the desired outcome. Additionally, in the context of cutting or drilling operations, similar complexities with respect to selection of the consumable products exist. Due to this complexity, users can often make mistakes when selecting and purchasing such consumable products in proper quantities for a given surfacing or cutting job. Users can also have difficulties with respect to the order in which consumable products should be used for a given job. In some instances, inexperience with the procedure, the type of material or surface being acted upon, and the consumable products themselves can lead to errors, waste, and inefficiencies. As such, improvements are needed in the area of surfacing and cutting consumable product quotation to limit or eliminate such issues.

BRIEF SUMMARY OF SOME EXAMPLES

According to some example embodiments, an example apparatus for generating a consumable product quotation is provided. The example apparatus may comprise processing circuitry configured to receive a surface status. The processing circuitry may be further configured to determine consumable product requirements for performing a job based on the surface status. In this regard, the processing circuitry may be further configured to determine the consumable product requirements based on consumable product parameters accessed in a consumable products database. Additionally, the processing circuitry may be configured to provide the consumable product requirements for output to a user. The consumable product requirements may comprise types of consumable products for the job. At least one of consumable products indicated by the consumable product requirements may be configured for installation on a rotary tool.

According to some example embodiments, an example method for generating a consumable product quotation is provided. In this regard, the example method may comprise receiving a surface status. The example method may further comprise determining, by processing circuitry, consumable product requirements for performing a job based on the surface status. In this regard, the consumable product requirements may also be determined based on consumable product parameters accessed in a consumable products database. Further, the example method may also comprise providing the consumable product requirements for output to a user, the consumable product requirements comprising types of consumable products for the job. In this regard, at least one of consumable products indicated by the consumable product requirements may be configured for installation on a rotary tool.

According to some example embodiments, a system comprising a rotary tool and a user terminal is provided. The rotary tool may comprise a motor, and at least one rotating element driven by the motor. In this regard, the at least one rotating element may be configured to receive a consumable product for acting upon a surface for a job. The rotary tool may also comprise a rotary tool communications interface. The user terminal may comprise processing circuitry and a user terminal communications interface. The processing circuitry may be configured to receive a surface status and determine consumable product requirements for performing a surfacing job based on the surface status. In this regard, the processing circuitry may be further configured to determine the consumable product requirements based on consumable product parameters accessed in a consumable products database, determine operational settings for the rotary tool based on the consumable product requirements, and transmit the operational settings from the user terminal communications interface to the rotary tool communication interface for use by the rotary tool during performance of the job.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 5 illustrates an example surfacing consumable product quotation according to some example embodiments;

DETAILED DESCRIPTION

Figure 1:
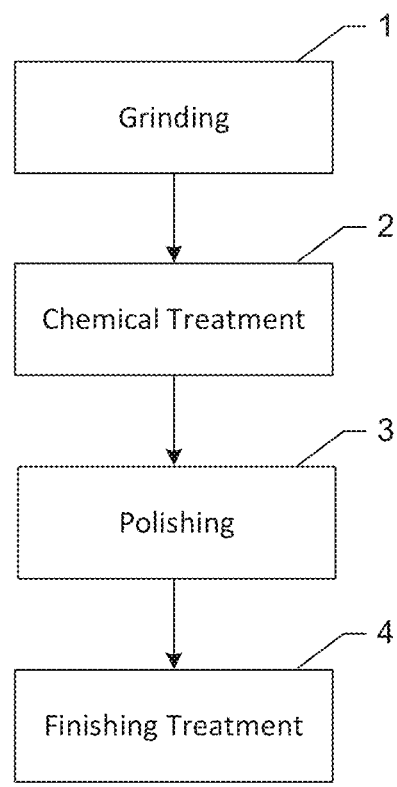
FIG. 1 illustrates an example surfacing procedure according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. As used herein, operable coupling should be understood to relate to direct or indirect connection that, in either case, enables functional interconnection of components that are operably coupled to each other.

Various example embodiments are directed to the facilitating effective and efficient consumable product selection and quotation in the context of a surfacing or cutting job. Additionally, according to some example embodiments, the provision of information regarding the implementation of the consumable products in the context of a surfacing or cutting job is also provided. According to some example embodiments, a cutting job may involve cutting a slot or groove into a surface or drilling into the surface. Such consumable products may be utilized for surfacing or cutting and may, for example, include industrial-grade diamonds formed on segments of a rotating consumable product. In this regard, for example, a surfacing job may be a construction project to smooth and apply a finish to a floor or other surface that is formed of a material such as concrete. A cutting job may involve cutting into a surface such as a floor, pillar, wall, or the like. As mentioned above, such a surfacing or cutting job can require multiple steps that involve acting upon the surface in different ways, with a variety of consumable products to achieve the desired result.

FIG. 1 illustrates a flow chart of some operations that may be undertaken in a typical surfacing job. A surfacing job may begin with grinding at 1. Grinding may be performed to remove a top layer of the surface and any residual adhesive that may be present on the surface. A powered rotary surfacing machine, as further described below with respect to FIGS. 2A to 2C, that generates a rotary motion of rotating elements that interact with the surface may be utilized in association with consumable grinding products to perform the grinding operation. In this regard, the rotary surfacing machine may include a motor-driven, rotating base to which consumable products may be affixed.

A user may move the rotary surfacing machine about the surface, for example in an overlapping back-and-forth pattern, to perform grinding of the entire jobsite area. The grinding operation at 1, may require that multiple different grinding consumable products be applied to the surface. Grinding consumable products may be grinding segments or pads. A segment may be a rigid block-shaped component and a plurality of such segments (e.g., three) may be affixed to the rotating base of the rotary surfacing machine at select locations. Alternatively, a pad is typically a circular, plate shaped component that is applied individually to the rotating base and may cover some or substantially all of the rotating base. The consumable grinding product (e.g., segment or pad) may also include abrasive grains (e.g., diamonds) of a desired size or grit. Highly abrasive products with large grains have a low grit value (e.g., 30 grit) and less abrasive products with small grains have a high grit value (e.g., 3000 grit). As such, for a first grinding pass on a surface, a low grit consumable segment or pad may be used to perform a coarse grinding operation. For a second pass, a higher grit consumable product may be affixed to the rotary surfacing machine to perform a less coarse/more fine grinding operation.

Upon completing grinding at 1, the surfacing process may continue with a chemical treatment at 2. The chemical treatment is typically provided as a liquid that is poured and spread onto the surface with, for example, a mop or other spreading implement. In some instances, the chemical treatment operation at 2 may also include a number of steps. In this regard, for example, a consumable product in the form of a regrouting bonding additive may be applied that adheres the dust from the grinding operation into pores or holes in the surface to fill the pores and holes. Additionally, a consumable product in the form of a surface hardener liquid may also be applied as part of the chemical treatment at 2 to increase the hardness and durability of the underlying surface that has been exposed due to the grinding operation.

After the chemical treatment is complete at 2, the surfacing process may continue with polishing at 3. Again, like the earlier operations, polishing at 3 may involve application of a number of consumable products. The polishing process takes the surface from a dull, raw material look, to a glossy sheen, if desired. Accordingly, similar to grinding, the polishing process may involve use of the rotary surfacing machine, however, with polishing consumable products applied to the rotating base. In this regard, the polishing process may begin with the use of lower grit polishing pads for a first pass, followed by a number of subsequent passes with increasingly higher grit polishing pads. For example, polishing may involve the use of 50 grit pads, followed by 100 grit pads, followed by 200 grit pads, followed by 400 grit pads, followed by 800 grit pads, followed by 1500 grit pads, followed by 3000 grit pads.

Upon completion of polishing at 3, the surfacing process may continue with performing a finishing treatment at 4 to seal and protect the polished surface. In this regard, the finishing treatment may similarly involve a number of steps and associated consumable products and the result of such finishing treatment may define a surfacing finishing type. For example, the finishing treatment at 4 may include application of a consumable product in the form of a sealer. The sealer may be applied as a liquid that is poured and spread onto the polished surface as a final sealant that will also form a protective layer on the surface to maintain the polished look. After applying the sealer, a consumable product in the form of a burnishing pad may be affixed to the rotary surfacing machine and applied to the surface. The application of the burnishing pad may operate to increase the glossy sheen to the surface that may have been dulled by the application of the sealer.

Accordingly, it can be seen that the procedure for implementing a surfacing job involves a number of operations and sub-operations involving the application of the numerous different consumable products at certain points in the process. Various example embodiments as described herein operate to automatically determine the consumable product requirements for a given surfacing job based on inputs provided by a user. According to some example embodiments, the outputs include a consumable product quotation that includes types and quantities of consumable products for the specific surfacing job. In addition to considering characteristics of the surface itself, some example embodiments also generate consumable product requirements based on geography, labor costs, or the like.

Figure 2A:
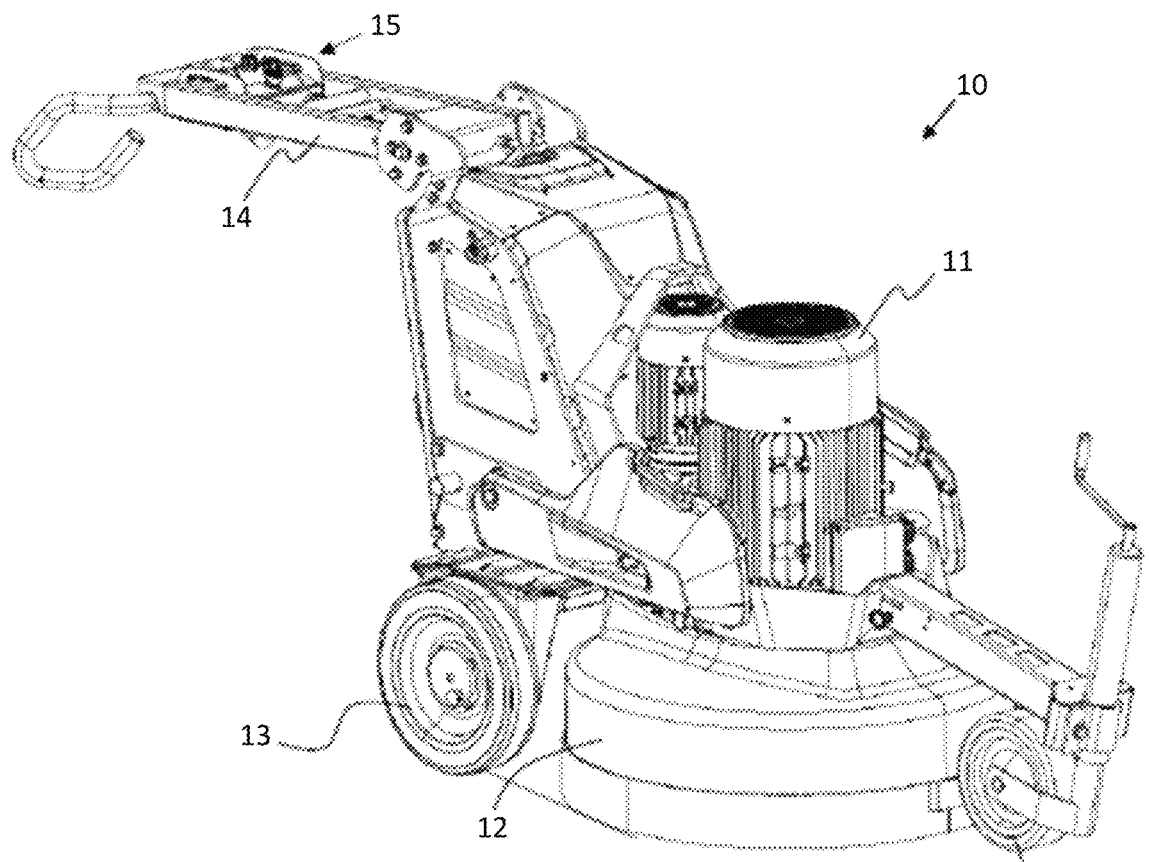
FIG. 2A illustrates a perspective side view of an example rotary tool in the form of a rotary surfacing machine according to some example embodiments.
Figure 2B:
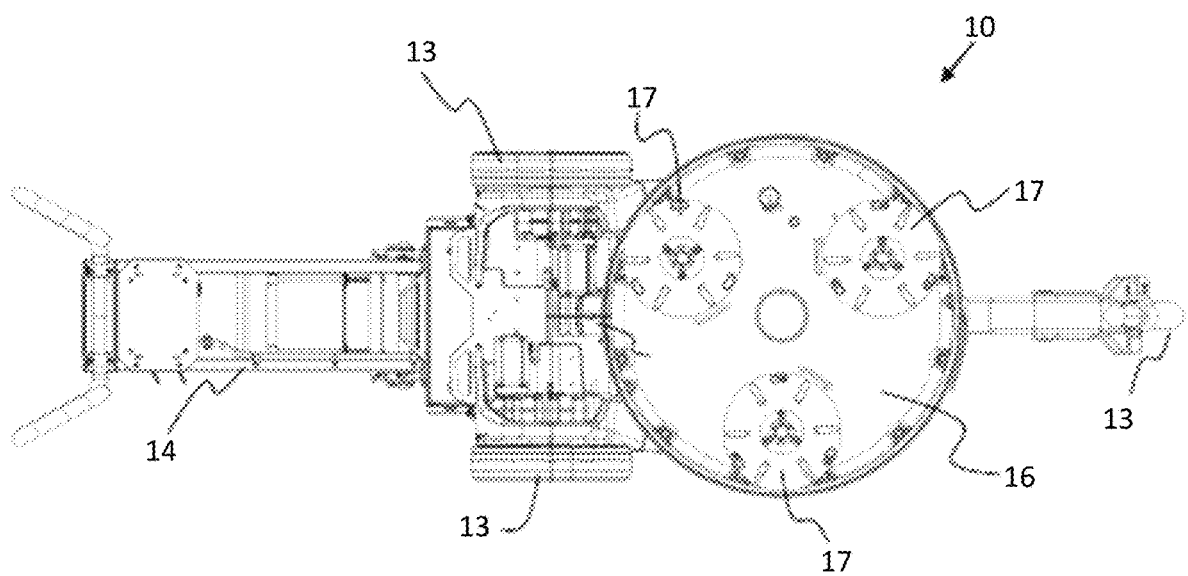
FIG. 2B illustrates a bottom view of the example rotary surfacing machine of FIG. 2A according to some example embodiments.

An example of a rotary surfacing machine 10 for use in a surfacing job is provided in FIGS. 2A and 2B, where FIG. 2A illustrates a perspective side view and FIG. 2B illustrates a bottom view. The rotary surfacing machine 10 may, for example, comprise a motor 11 that is operably coupled to a rotary unit 12. The motor 11 may be configured to drive rotating elements of the rotary unit 12, including a planetary rotary disc 16. Additionally, for example, via gearing or the like, the motor 11 may also be configured to separately rotate satellite discs 17, which may be coupled to the planetary rotary disc 16. As further described herein, consumable rotating products (e.g., grinding segments or pads, polishing pads, or the like) may be installed on one, two, or three of the discs 17 when the rotary surfacing machine 10 is performing various surfacing operations. Rotation of the planetary rotary disc 16 and separately rotation of the satellite discs 17 may be separately controlled such that the planetary rotary disc 16 may rotate a first rotations per minute (RPM) and the satellite discs 17 may rotate at a second RMP. Further, directions of rotation of the planetary rotary disc 16 and the satellite discs 17 may be separately controlled. According to some example embodiments, the rotary surfacing machine 10 may include only the planetary rotary disc 16, and consumable products may be installed directly onto the planetary rotary disc 16. Additionally, according to some example embodiments, the forward or reverse movement of the rotary surfacing machine 10 may be powered and controlled to move at a desired speed. For mobility, the rotary surfacing machine 10 may also include wheels 13, which may or may not be powered.

Figure 2C:
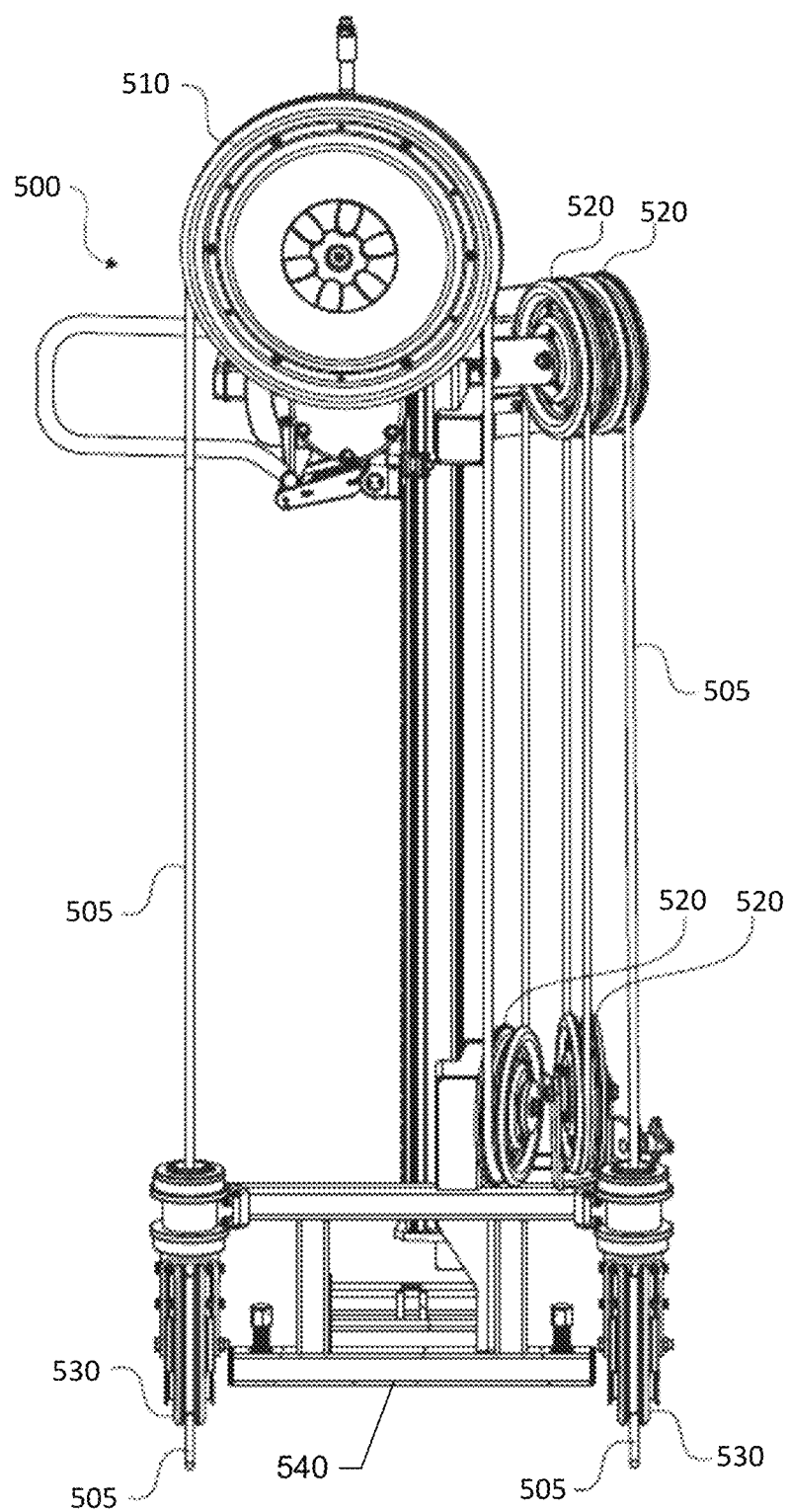
FIG. 2C illustrates front view of an example rotary tool in the form of a wire saw according to some example embodiments.

Now referring to FIG. 2C, another machine that utilizes consumable products in the form of a wire saw 500 is provided. In this regard, the wire saw 500 may be configured to feed a cutting wire 505 around an object to cut through the object. For example, the wire saw 500 may be affixed to a pillar or column (e.g., a cement pillar or column) and the cutting wire 505 may be wrapped around the pillar or column and slowly tightened to use the cutting wire 505 to cut through the pillar or column. The wire saw 500 may comprise a drive pulley 510 that is operable coupled to a motor via the frame 540. The control pulleys 520 may be movable to control the cutting loop portion of the cutting wire 505 as the cutting wire 505 is cutting through an object. Additionally, guide pulleys 530 may swivel or otherwise move to guide the cutting wire 505 around the object to be cut. The cutting wire 505 may be fed through each of the pulleys 510, 520, 530, and around an object to be cut, noting that the cutting loop portion of the cutting wire 505 is not shown in FIG. 2C. The cutting wire 505 exiting each of the guide pulleys 530 are shown as ends, but it is understood that these ends are connected to form a cutting loop around an object during operation.

The cutting wire 505 may therefore be a consumable product for use with the wire saw 500. The cutting wire 505 may be formed of a number of materials with a cutting surface of the cutting wire 505 comprising, for example, industrial-grade diamonds. The cutting wire 505 may have certain length for a particular job, and therefore the size, e.g., diameter, of the object to be cut may be an input parameter for determining a proper length for the cutting wire 505 for a job. Additionally, the cutting wire 505 may have a cutting rating (e.g., indicative of the amount of grit or cutting material) which may be associated with the types or grades of material that are to be cut with cutting wire 505 having a particular rating. The cutting wire 505 may also have a diameter. Again, the diameter of the cutting wire 505 may also be a factor that may be considered when selecting a cutting wire 505 for a particular job, since the diameter may be selected based on the wire saw 500 or the type of job.

Figure 2D:
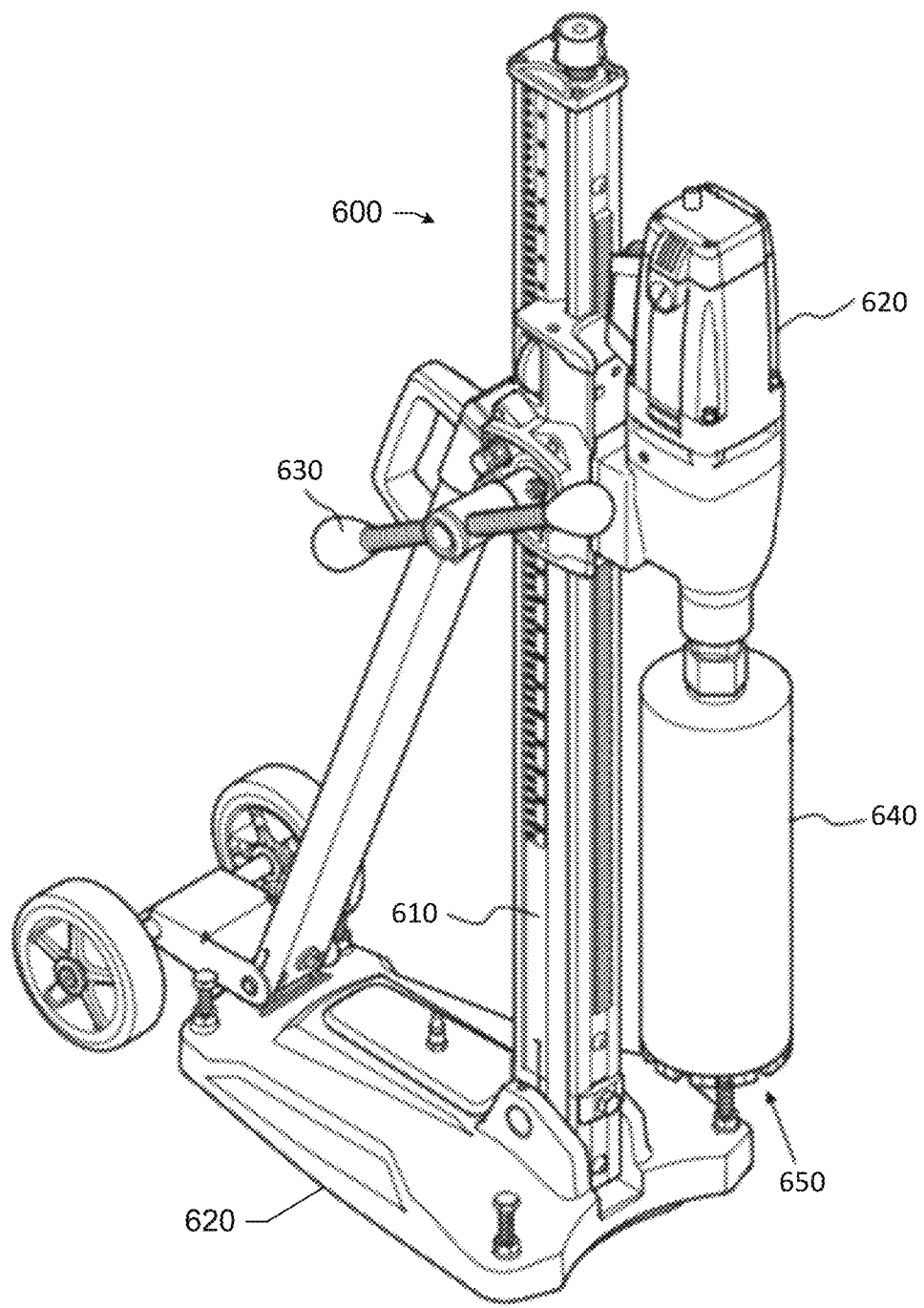
FIG. 2D illustrates perspective side view of an example rotary tool in the form of a core drill stand according to some example embodiments.

FIG. 2D illustrates another cutting machine in the form of a core drill stand 600 that utilizes consumable products according to some example embodiments to cut, for example, a hole into a floor (e.g., cement floor) or other surface. In this regard, the core drill stand 600 may comprise a base 620, a guide arm 610, a press control 630, and a drill 620. The base 620 may be configured to operate as a support for the guide arm 610. The drill 620 may be operably coupled to the guide arm 610 such that the drill 620 may move vertically up or down on the guide arm 610. On the rotating spindle of the drill, a drill bit 640 may be affixed. The drill bit 640 may include cutting segments 650. According to some example embodiments, the entire drill bit 640 including the cutting segments 650 may be a consumable product or the cutting segments 650 may be replaceable on the drill bit 640, and therefore the cutting segments 650 may be a separate consumable product.

In this regard, the cutting segments 650 may comprise, for example, industrial-grade diamonds for cutting into a surface, such as, for example, concrete. In this regard, the cutting segments 650 may have a cutting rating (e.g., indicative of the amount of grit or cutting material) which may be associated with the types or grades of material that are to be cut with cutting segments 650 having a particular rating. Further, a working parameter may be a number of cutting segments 650 that are attached to the drill bit 640. Further, the drill bit 640 may have a diameter, and as such, a drill bit 640 with a larger or smaller diameter may be used based on the needs of a particular job.

Figure 2E:
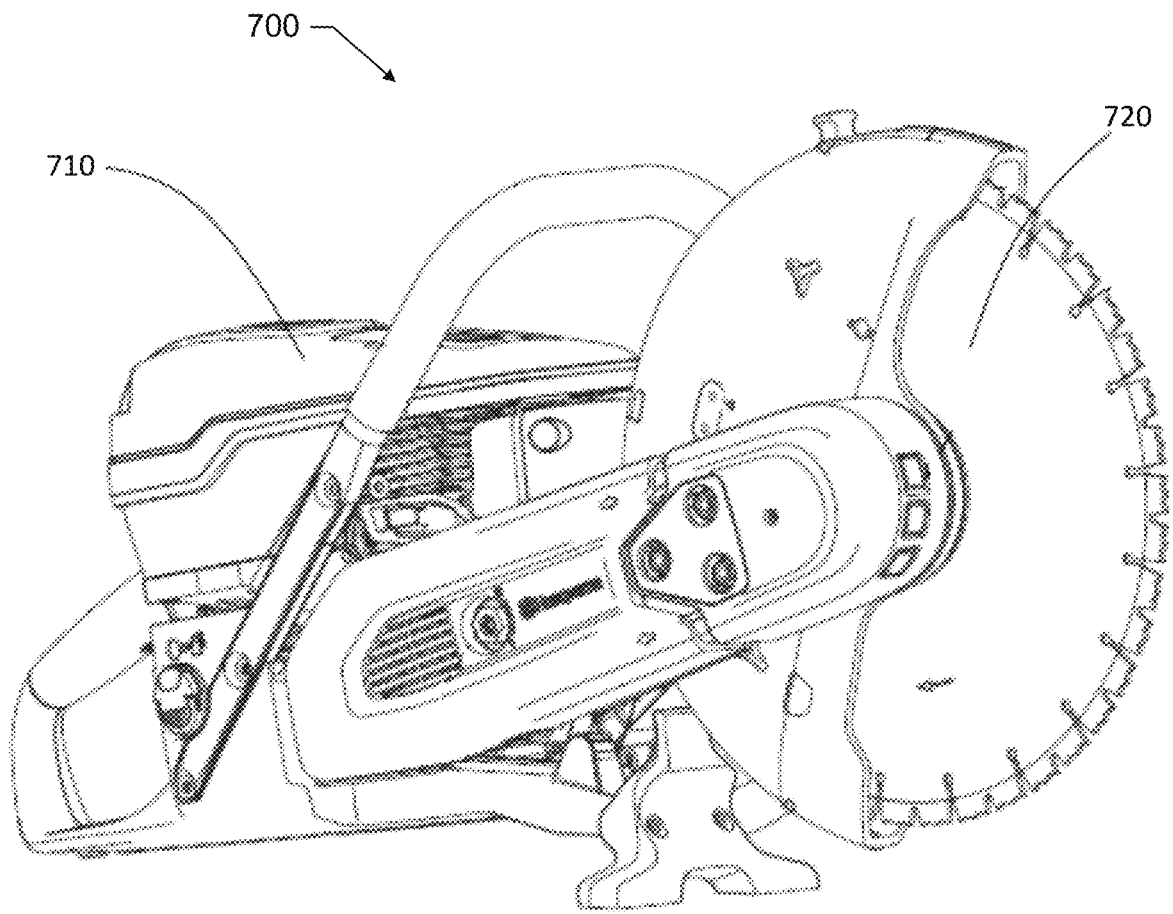
FIG. 2E illustrates perspective side view of an example rotary tool in the form of a power cutter according to some example embodiments.

FIG. 2E illustrates another cutting machine in the form of a power cutter 700. The power cutter 700 may comprise a motor 710 and a cutting blade 720. The motor 710 may be configured to, via rotation of a drive shaft, cause the cutting blade 720 to rotate at a relatively high rotations per minute (RPM) to permit the cutting blade 720 to cut a slot into surface, such as a floor, roadway, wall, or the like. According to some example embodiments, the cutting blade 720 may be a circular member with cutting teeth disposed along an external edge of the cutting blade 720. The cutting teeth, according to some example embodiments, may include abrasive materials for cutting such as, for example, industrial-grade diamonds.

The cutting blade 720 may therefore be a consumable product for use with the power cutter 700. In this regard, the cutting blade 820 may be selected based on, for example, the cutting rating (e.g., indicative of the amount of grit or cutting material) which may be associated with the types or grades of material that are to be cut with cutting blade 720 having a particular rating. Further, the cutting blade 720 may have a central opening, where the size or shape of the opening is associated with the types of power cutters 700 that the cutting blade 720 may be used with. Additionally, the cutting blade 720 may have a diameter. The diameter of a cutting blade 720 may be selected based on the type of power cutter 700 being used or based on the type of job being performed.

Figure 2F:
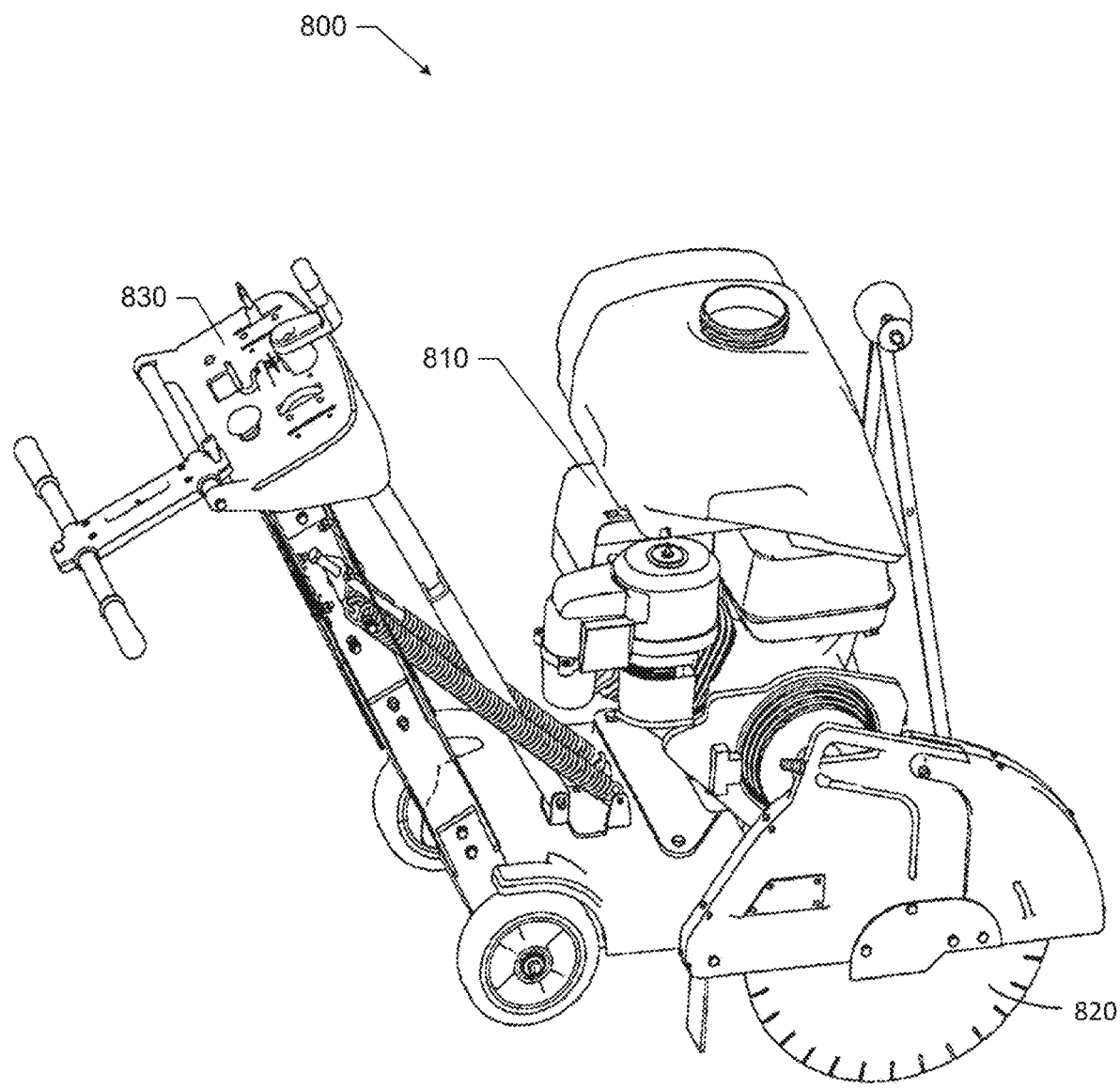
FIG. 2F illustrates perspective side view of an example rotary tool in the form of a floor saw according to some example embodiments.

FIG. 2F illustrates another cutting machine in the form of a floor saw 800. The floor saw 800 may comprise a motor 810 and a cutting blade 820. The motor 810 may be configured to, via rotation of a drive shaft, cause the cutting blade 820 to rotate at a relatively high rotations per minute (RPM) to permit the cutting blade 820 to cut a slot into a floor surface or a roadway or the like, as the floor saw 800 moves forward or backward. As seen in FIG. 2F, the floor saw 800 may also include a user interface 830 for controlling the operation of the floor saw 800. According to some example embodiments, the cutting blade 820 may be a circular member with cutting teeth disposed along an external edge of the cutting blade 820. The cutting teeth, according to some example embodiments, may include abrasive materials for cutting such as, for example, industrial-grade diamonds.

The cutting blade 820 may therefore be a consumable product for use with the floor cutter 800. In this regard, the cutting blade 820 may be selected based on, for example, the cutting rating (e.g., indicative of the amount of grit or cutting material) which may be associated with the types or grades of material that are to be cut with cutting blade 820 having a particular rating. Further, the cutting blade 820 may have a central opening, where the size or shape of the opening is associated with the types of floor cutters 800 that the cutting blade 820 may be used with. Additionally, the cutting blade 820 may have a diameter. The diameter of a cutting blade 820 may be selected based on the type of floor saw 800 being used or based on the type of job being performed.

Accordingly, each of the rotary surfacing machine 10, the wire saw 500, the core drill stand 600, power cutter 700, floor saw 800, or the like, each of which may be referred to as a rotary tool, may be operated in association with consumable products. Other types of rotary tools may be also include wall saws, other types of drills, and the like. As mentioned above, a wide variety of consumable products may be used in association with these machines or tools. The consumable products for use on a specific job may be selected based on a number of different criteria. For example, the consumable products may be selected based on the manner in which the machine or tool is intending to be used or a setup of the tool for a particular job. Further, the consumable products may be selected based on the performance, a performance rating, or a cutting rating of the consumable products. Additionally, according to some example embodiments, the consumable products for a machine or tool may be selected based upon the availability (e.g., inventory levels) of the consumable products, in stores or via e-commerce.

Figure 2G:
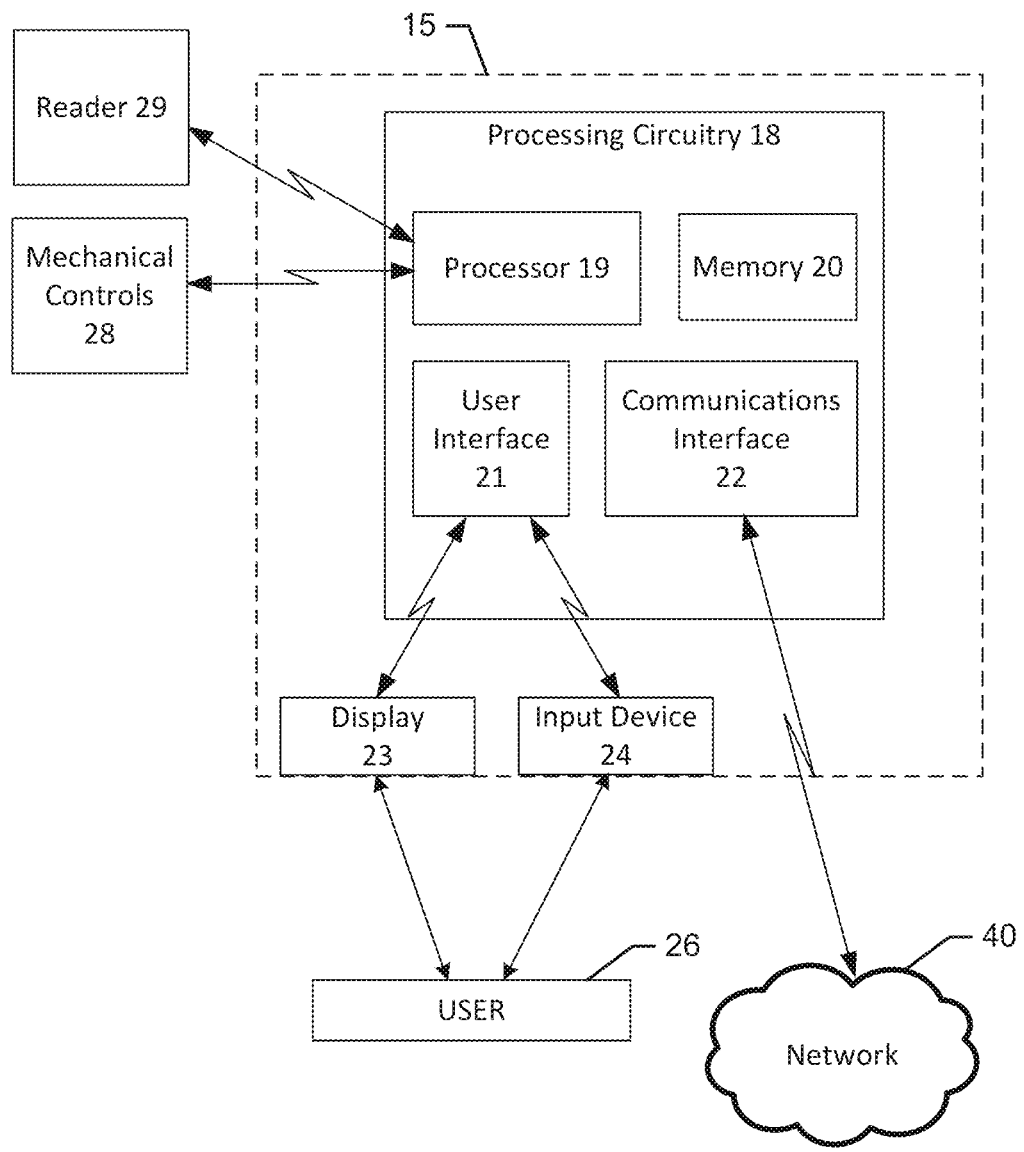
FIG. 2G illustrates a block diagram of an electronic platform of an example rotary tool according to some example embodiments.

Each of the rotary tools (e.g., rotary surfacing machine 10, the wire saw 500, the core drill stand 600, the power cutter 700, the floor saw 800, and the like) the may also include an electronics platform 15. With reference to FIG. 2G, the electronics platform 15 may comprise processing circuitry 18. The processing circuitry 18 may comprise a processor 19, a memory 20, a user interface 21, and a communications interface 22. Further, according to some example embodiments, processing circuitry 18 may be in operative communication with or embody, the memory 20, the processor 19, the user interface 21, and the communications interface 22. Through configuration and operation of the memory 20, the processor 19, the user interface 21, and the communications interface 22, the processing circuitry 18 may be configurable to perform various operations as described herein, including the operations and functionalities described with respect to controlling the operation of the rotary tools. In this regard, the processing circuitry 18 may be configured to perform computational processing, memory management, user interface control and monitoring, and manage remote communications, according to an example embodiment. In some embodiments, the processing circuitry 18 may be embodied as a chip or chip set. In other words, the processing circuitry 18 may comprise one or more physical packages (e.g., chips) including materials, components or wires on a structural assembly (e.g., a baseboard). The processing circuitry 18 may be configured to receive inputs (e.g., via the user interface 21 or the communications interface 22), perform actions based on the inputs, and generate outputs (e.g., control signals to mechanical controls 28, which may control operation of a motor of the rotary tool. For example, with respect to the rotary surfacing machine 10, the mechanical controls 28 may be configure to control the operation of the motor 11, rotation of the planetary rotary disc 16, rotation of the satellite discs 17, propulsion and guidance elements, and other actuators of the rotary surfacing machine 10. In an example embodiment, the processing circuitry 18 may include one or more instances of a processor 19, associated circuitry, and memory 20. As such, the processing circuitry 18 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 20 may include one or more non-transitory memory devices such as, for example, volatile or non-volatile memory that may be either fixed or removable. The memory 20 may be configured to store information, data, applications, instructions or the like, including operational settings, for enabling, for example, the operations of the rotary tool. The memory 20 may operate to buffer instructions and data during operation of the processing circuitry 18 to support higher-level functionalities, and may also be configured to store instructions for execution by the processing circuitry 18. According to some example embodiments, various data stored in the memory 20 may be generated based on other data and stored or the data may be retrieved via the communications interface 22 and stored in the memory 20.

As mentioned above, the processing circuitry 18 may be embodied in a number of different ways. For example, the processing circuitry 18 may be embodied as various processing means such as one or more processors 19 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 18 may be configured to execute instructions stored in the memory 20 or otherwise accessible to the processing circuitry 18. As such, whether configured by hardware or by a combination of hardware and software, the processing circuitry 18 may represent an entity (e.g., physically embodied in circuitry—in the form of processing circuitry 18) capable of performing operations according to example embodiments while configured accordingly. Thus, for example, when the processing circuitry 18 is embodied as an ASIC, FPGA, or the like, the processing circuitry 18 may be specifically configured hardware for conducting the operations described herein. Alternatively, as another example, when the processing circuitry 18 is embodied as an executor of software instructions, the instructions may specifically configure the processing circuitry 18 to perform the operations described herein.

The communication interface 22 may include one or more interface mechanisms for enabling communication with other devices external to the rotary tool, via, for example, network 40, which may, for example, be a local area network, the Internet, or the like, through a direct (wired or wireless) communication link to another external device, or the like. In some cases, the communication interface 22 may be any means such as a device or circuitry embodied in either hardware, or a combination of hardware and software that is configured to receive or transmit data from/to devices in communication with the processing circuitry 18. The communications interface 22 may be a wired or wireless interface and may support various communications protocols (WIFI, Bluetooth, cellular, or the like).

The user interface 21 may be controlled by the processing circuitry 18 to interact with peripheral components or devices of rotary tool that can receive inputs from a user 26 or provide outputs to a user 26. In this regard, via the user interface 21, the processing circuitry 18 may be configured to receive inputs from an input device 24 which may be, for example, a touch screen display, a keyboard, a mouse, a microphone, or the like. The user interface 21 may also be configured to provide control and outputs to peripheral devices such as, for example, a display 23 (e.g., a touch screen display), speaker, or the like. The user interface 21 may also produce outputs, for example, as visual outputs on a display, audio outputs via a speaker, or the like.

Additionally, the user interface 21 may be configured to permit a user of the rotary tool to input operational settings. For example, via the user interface 21, a user may input operational settings for the rotary surfacing machine 10 for a particular surfacing operation (e.g., grinding, polishing, etc.) that, via the processing circuitry 18, that provides control signals to mechanical controls 28 to, for example, control the motion of the planetary rotary platform 16 and the satellite discs 17.

The user interface 21 may be affixed to the rotary tool at a location that is convenient to the user. For example, according to some example embodiments, the user interface 15 of the rotary surfacing machine 10 may be an example of the user interface 21, which may be supported by a steering handle 14 that is coupled to the main body of the rotary surfacing machine 10. Additionally, the communications interface 22 may support, for example, wireless communications to or from the rotary tool to, for example, receive operational settings or other operating parameters for controlling the operation of the rotary tool for use either by the user 26 or directly by the rotary tool during a job. For example, according to some example embodiments, rotary surfacing machine parameters may be received for controlling the operation of the rotary surfacing machine 10 for use either by the user 26 or directly by the rotary surfacing machine 10 during a surfacing job.

Figure 3:
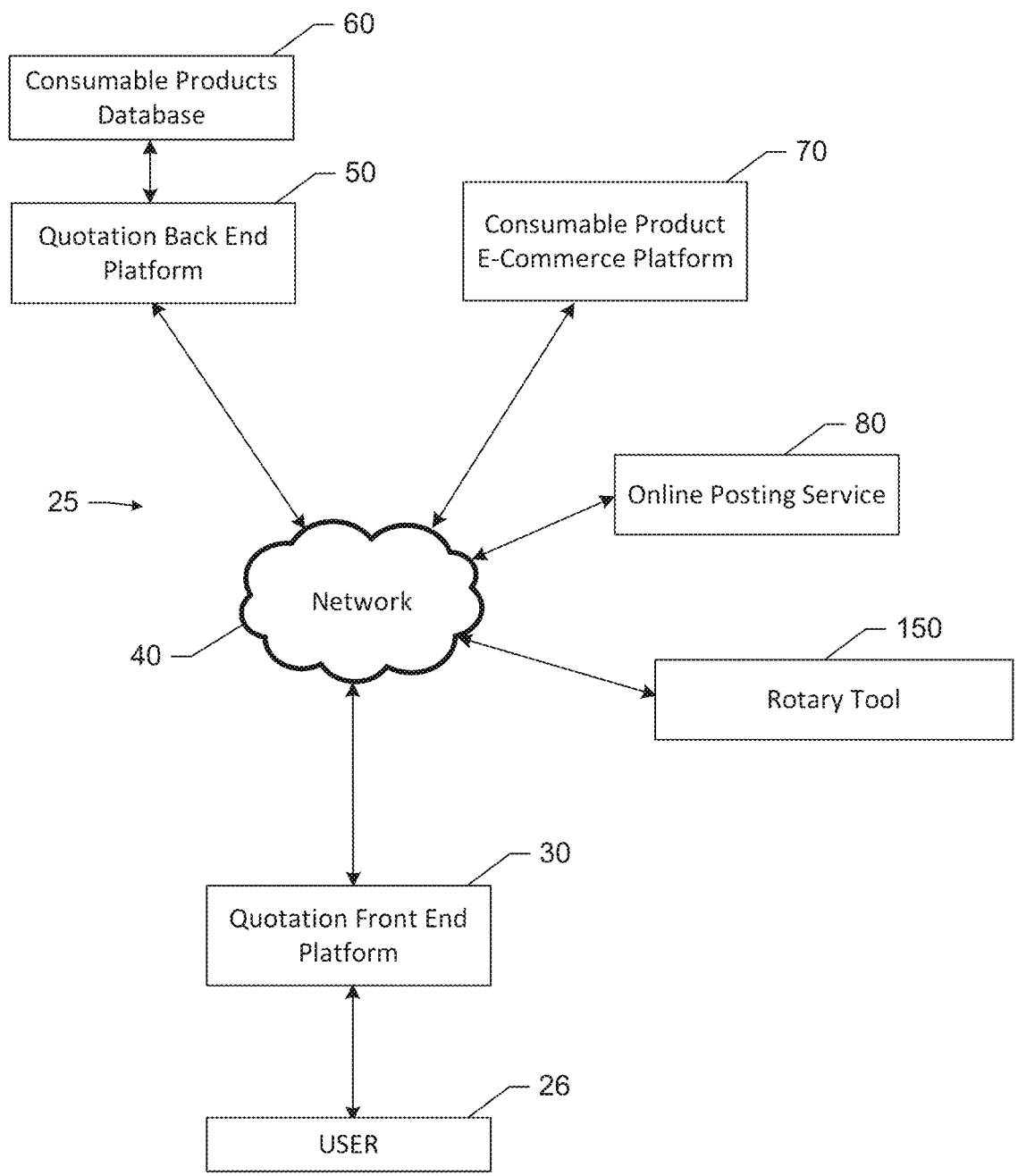
FIG. 3 illustrates an example system for generating a consumable product quotation according to some example embodiments.

In this regard, FIG. 3 illustrates an example system 25 configured to determine consumable product requirements for a job (e.g., a surfacing job) and generate a consumable product quotation, such as, for example, a surfacing consumable product quotation based on the consumable product requirements for a rotary tool 150, according to some example embodiments. As mentioned above, the rotary tool 150 may be, for example, the rotary surfacing tool 10, the wire saw 500, the core drill stand 600, power cutter 720, or the like. The example system may also be configured to determine operational settings for the rotary tool 150 based on the consumable product requirements. The example system 25 may comprise a number of interconnected processing entities that communicate and operate in cooperation to assist in the generation of a consumable product requirements, as well as other functionalities as described herein. In this regard, the example system may comprise a quotation front end platform 30, a network 40, a quotation back end platform 50, and a consumable products database 60. Further, according to some example embodiments, the example system 25 may also include a consumable product example-commerce platform 70, an online posting service 80, and the rotary tool 150.

In this regard, the quotation front end platform 30 may be a user terminal, communications and processing device that permits a user to input information, such as job information and profile information, for analysis in association with a job. According to some example embodiments, the quotation front end platform 30 may be, for example, a smart phone or similar device that is configured to operate in accordance with the quotation front end platform 30 as described herein. In this regard, the quotation front end platform 30 may include a user interface that permits a user 26 to input information into the quotation front end platform 30. Additionally, the quotation front end platform 30 may be configured to perform various processing functionalities associated with determining consumable product requirements for a job. As further described below, the quotation front end platform 30 may include or be configured via a quotation front end module 215 to receive inputs associated with jobs to facilitate analysis of those inputs to generate consumable product requirements and consumable product quotations for jobs. The quotation front end platform 30 may, via the quotation front end module 215, be configured to output consumable product requirements or a consumable product quotation to a user (e.g., via a display or the like) or otherwise take action with respect to the product requirements or the consumable product quotation as described below.

The quotation front end platform 30 may be in communication with various entities via the network 40. The quotation front end platform 30 may be configured to connect to the network 40 via wired or wireless communications techniques. The network 40 may therefore be configured to link to the quotation front end platform 30 and other entities via wired or wireless communications. In this regard, according to some example embodiments, the network 40 may include the cellular or WIFI network to connect to the quotation front end platform 30. Further, the network 40 may also include the Internet and therefore quotation front end platform 30 may be able to access entities connected to the Internet via connection to the network 40.

Figure 6:
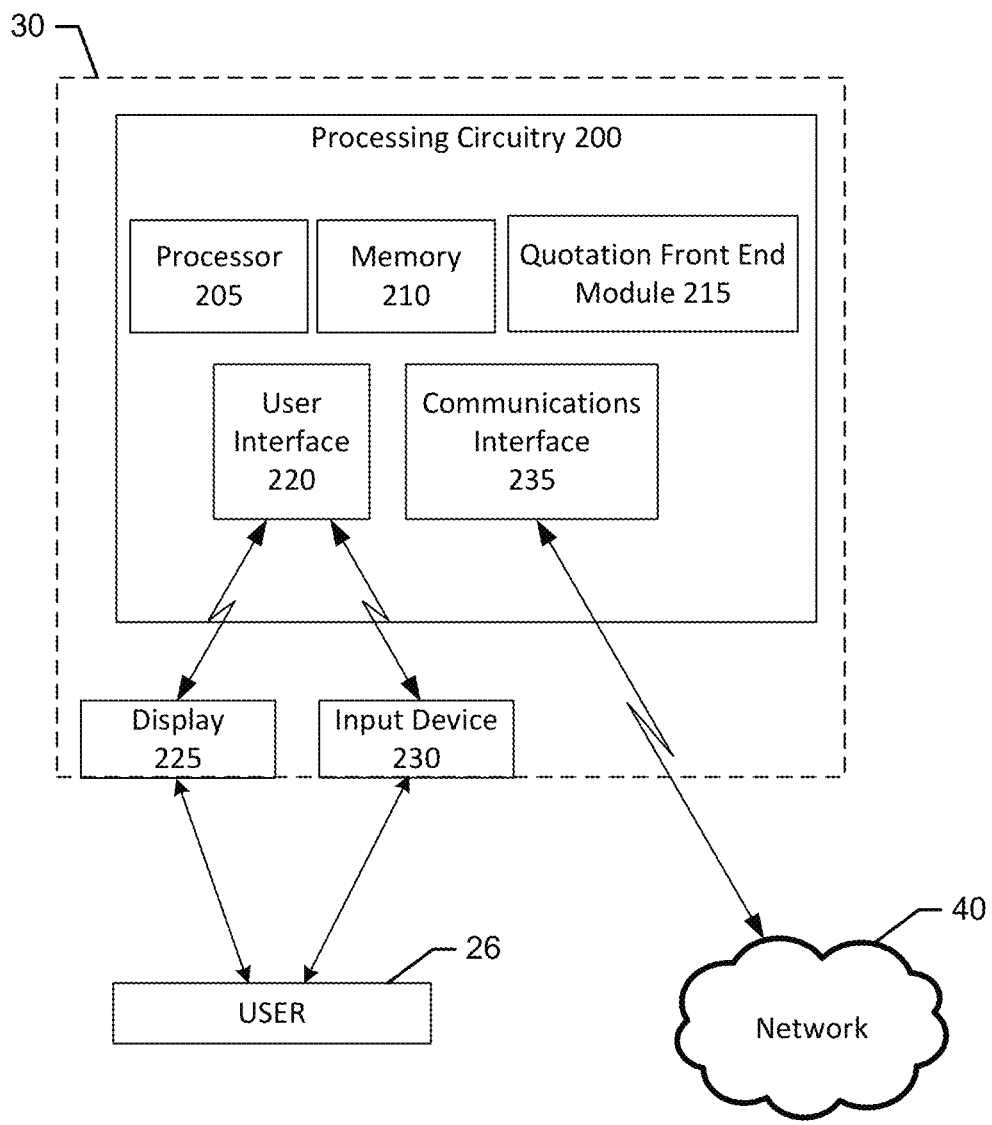
FIG. 6 illustrates an example quotation front end platform for generating a consumable product quotation according to some example embodiments.

For example, the quotation front end platform 30 may be able to access the quotation back end platform 50 via the network 40. In this regard, the quotation back end platform 50 may be a network server or other communications and processing device configured to assist with the generation of consumable product requirements and a consumable product quotation for a job. According to some example embodiments, the quotation back end platform 50 may include or be configured via a quotation back end module 315 (FIG. 7), to receive inputs from, for example, the quotation front end platform 30 and determine consumable product requirements to generate a consumable product quotation for a job. To do so, the quotation back end platform 50, via the quotation back end module 315, may be configured to access the consumable products database 60, which may be stored and maintained in a memory of the quotation back end platform 50 or the consumable products database 60 may reside on another entity that is otherwise accessible to the quotation back end platform 50, possibly via the network 40. In this regard, the quotation back end platform 50 may be configured to analyze the characteristics or parameters of the various consumable products described in the consumable products database 60, based on the inputs provided by the quotation front end module 215 (FIG. 6), to determine which consumable products should be automatically selected for use in completing a given job. The selected consumable product may be referred to as consumable product requirements for a job and the quotation back end platform 50 may be configured to generate a consumable product quotation based on the consumable product requirements for delivery to the quotation front end module 215 and the user 26. Alternatively, according to some example embodiments, the consumable product requirements may be delivered to the quotation front end platform 30, which may be configured to generate the consumable product quotation for provision to the user 26.

Additionally, according to some example embodiments, the consumable product quotation may be provided, via the network 40, to the consumable e-commerce platform 70, which may be a communications and processing device with the ability to establish a communications link with the network 40. In this regard, the consumable e-commerce platform 70 may be configured to receive the consumable product quotation and take action to purchase the consumable products indicated in the consumable product quotation for delivery to the user 26 or for pickup by the user 26 at a specified location. Further, according to some example embodiments, the online posting service 80 may also be a communications and processing device with the ability to establish a communications link with the network 40. In this regard, the online posting service 80 may be configured to receive a consumable product quotation from, for example, the quotation front end platform 30 and post the consumable product quotation on a public or semi-public online forum to share the consumable product quotation with other users.

Additionally, according to some example embodiments, rotary tool machine parameters (or operational settings) may be determined and communicated within the system 10. In this regard, operational settings may be settings for the rotary tool 150 that may configure the rotary tool 150 to operate in a desired manner. Such settings may include, for example, forward speed, planetary rotation speed, drill bit pressure, satellite rotation speed, weight, water output rate, or the like. As further described below, the operational settings may be determined for each step in a sequence of a job, such as a surfacing job. The operational settings may be determined based on the inputs received by the quotation front end platform 30 or the quotation back end platform 50. In this regard, the operational settings may be communicated from the quotation front end platform 30 or the quotation back end platform 50 to the rotary tool 150 via, for example, the network 40. Alternatively, the quotation front end platform 30 may be configured to communicate directly with a communications interface of the rotary tool 150 (e.g., via Bluetooth or the like) to provide the operational settings.

As such, communications with the rotary tool 150, such as the rotary surfacing machine 10, may be wireless communications.

Having described the example system 25 and some of the entities of the example system 25 at a high-level, a more detailed description of the functionalities of the quotation front end module 215 and the quotation back end module 315 will now be described. As mentioned above, according to some example embodiments, the quotation front end module 215 may be a component of the quotation front end platform 30 as further described herein and the quotation back end module 315 may be a component of the quotation back end platform 50 as further described herein. However, it is understood that while the functionality of the quotation back end module 315 has been described with respect to implementation by the quotation back end module 315, according to some example embodiments, the quotation front end module 215 may be configured to perform some or all of the functionalities described with respect to the quotation back end module 315. In this regard, for example, according to some example embodiments, the consumable products database 60 may be stored on the quotation front end platform 30 and thus, according to some example embodiments, a consumable product quotation may be generated without involvement or communications with other entities in such example embodiments.

Figure 4:
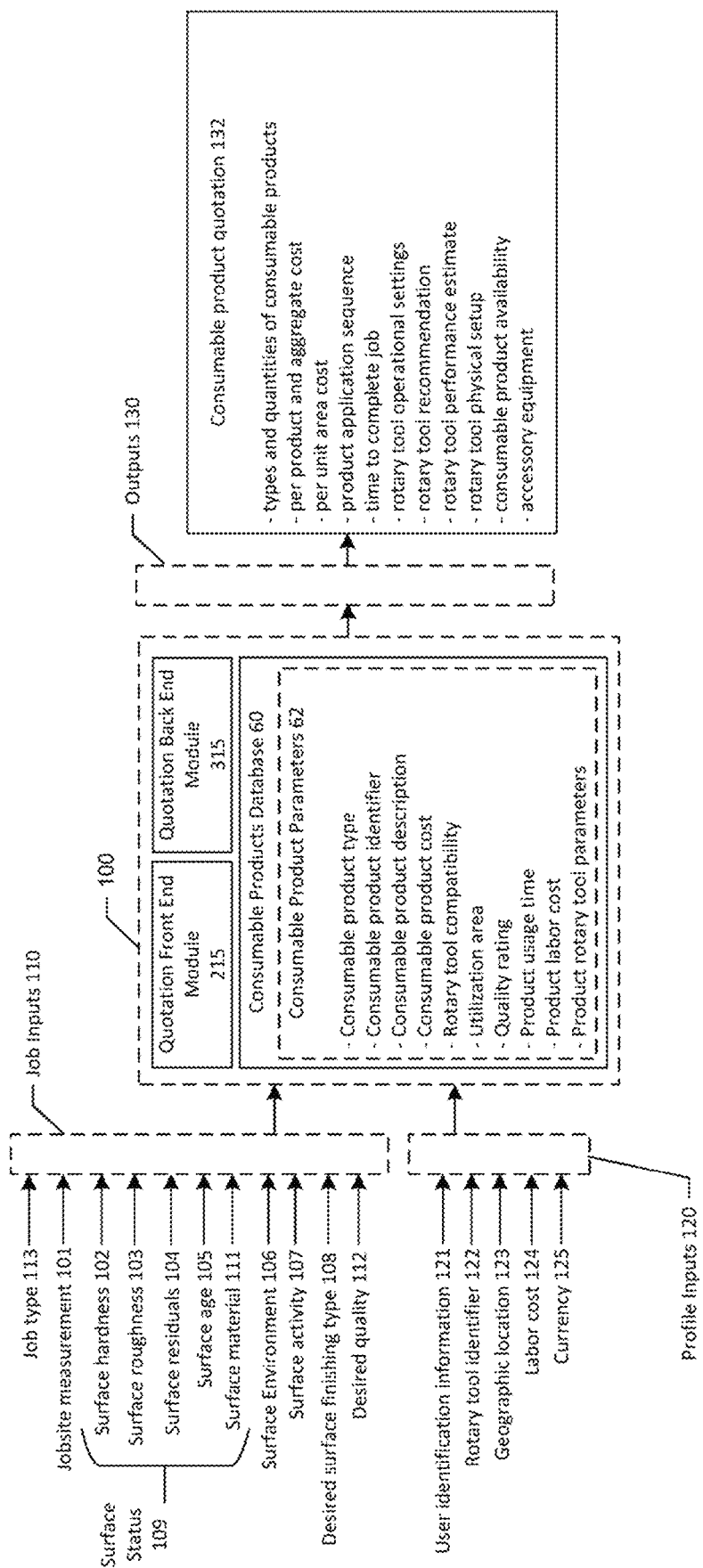
FIG. 4 illustrates a flow diagram for inputs and outputs of an example system for generating a consumable product quotation according to some example embodiments.

Referring now to FIG. 4, an aggregated entity 100 is shown that includes the quotation front end module 215, the quotation back end module 315, and the consumable products database 60. The aggregated entity 100 may be configured to receive inputs and provide outputs. In the example embodiment shown in FIG. 4, the aggregated entity 100 is configured to generate outputs 130 and a consumable product quotation 132 in the context of a job, such as a surfacing job or a cutting job. Following from above, while these entities are shown in combination within the single aggregated entity 100, it is understood that the functionalities described may be distributed to various devices within, for example, the example system 10.

In this regard, the quotation front end module 215 may be configured to receive a number of inputs that may be user inputs. In this regard, the inputs may be categorized into, for example, job inputs 110 and profile inputs 120. The job inputs 110 may be inputs that are related to a specific job that is to be quoted for consumable products. The profile inputs 120, on the other hand, may be general inputs that may be associated with, for example, the user or that are otherwise more broadly applied across more than one job. Regardless of the type of inputs, according to some example embodiments, the inputs 110 and 120 may be factors used in determining the consumable product requirements for a job. According to some example embodiments, the inputs 110 and 120 may be, for example, entered by a user via a user interface (e.g., user interface 220) of a device configured to operate in accordance the quotation front end module 215 (e.g., the quotation front end platform 30). Such inputs may be hand-entered via, for example, a touch screen display, voice-entered via a microphone, or, at least in some instances, automatically entered via sensor (e.g., a global positioning system sensor, a measurement sensor, a camera, or the like). Further, according to some example embodiments, inputs may be entered via a user interface that displays images that are representative of surfaces (e.g., either a current surface or a desired surface) for selection by the user to simplify entry of the inputs, as further described below.

The job type 113 may be a job input 110. In this regard, the job type 113 may be, for example, a surfacing job or a cutting job. Additionally, according to some example embodiments, further description of the job type 113 may be provided for example, the job type 113 may be a cutting job for a drilling operation or a cutting job for a slot cutting operation.

As another input, or as built into the job type 113, other operational aspects relating to the job may be provided as inputs. In this regard, for example, the use of water or other substance, or use of no water or other substance during such a job (e.g., during cutting) may be an input 110. In some instances, whether or not water is used may be function of access to a water source. Further, the operational aspects may also be a function of the rotary tool that is available to complete the job and the functionality of that rotary tool (e.g., includes a water system or does not include a water system.

According to some example embodiments, a jobsite measurement 101 may be an example of a job input 110. In this regard, the jobsite measurement 101 may be measurement associated with the surface to be acted upon such as, the area to be subjected to the surfacing process, a diameter of a core to be cut, a length or width of a slot cut by a power cutter, a diameter of a pillar or support to be cut by a wire saw, or the like. A user may, for example, measure dimensions of the surface and determine, for example, the area or a diameter. The units for the jobsite measurement 101 may be, for example, feet, meters, square feet (sqft), meters squared ($m^2$), or the like. According to some example embodiments, a jobsite measurement 101 need not be required to generate some outputs, such as those that are not dependent upon quantities, such as, for example, a consumable product quotation that provides products required per unit area (e.g., square meter or square foot) or per unit length, or the like. In some instances, the jobsite measurement 101 may be linked directly to a parameter of a necessary consumable product. In this regard, for example, a diameter of a core to be drilled or cut may directly indicate the drill bit diameter that may be used for performing the core drilling.

Another job input 110 may be a surface status 109. The surface status 109 may be generally indicative of the current condition of the surface to be acted upon, prior to performing the surfacing or cutting job. The surface status 109 may be defined by one or more of characteristics of the surface that may be used as job inputs 110 such as, for example, surface hardness 102, surface roughness 103, surface residuals 104, surface age 105, or surface material 111. These and other characteristics of the surface may be aggregated or combined to define the surface status 109 of a particular surface, or the surface status 109 may be a collection of separate characteristics.

An example job input 110 that may be a component of the surface status 109 may be surface hardness 102. In this regard, the surface hardness 102 may be an indication of the degree of solidity or firmness of the surface. Further, the surface hardness may be based on a scale, i.e., a hardness scale, and thus a numerical value may be used as the surface hardness 102. The surface hardness 102 may be measured via procedures such as a scratch test or the like. Further, the surface hardness 102 may be ascertained by visual inspection. Additionally, according to some example embodiments, an assumption of the surface hardness 102 may be made based on a geographic region in which the user, or more specifically, the jobsite is located. In this regard, for example with respect to concrete, it has been determined that materials used to prepare concrete for construction are often regionally-based and thus the hardness of the concrete formed by those materials in a given geographic region may be the same or similar. The age of the surface may also be a factor that may be used when determining a surface hardness assumption for use as an input for the surface hardness 102.

The surface roughness 103 may be another example of a job input 110 that may be a component of surface status 109. The roughness of the surface may be due to the erosion of a surface's smooth finish due to wear or environmental factors (i.e., rain) or the like. In this regard, a rough surface may have loose or exposed grains and may include small holes or low spots. The surface roughness 103 may be provided as input with respect to a roughness scale (e.g., a scale from 1 (smooth) to 5 (very rough).

Surface residuals 104 may, additionally or alternatively, be another example job input 110 that may be a component of the surface status 109. In this regard, in some instances, the surface to be acted upon may have been previously subjected to a surfacing process or other process that has left residual material or features on the surface. For example, if the surface was previously covered by tile that has since been removed, a layer of residual thinset may remain on the surface. Similarly, in some instances, a layer of adhesive or finish may be disposed on the surface. The type and characteristics of such residuals may be indicated by the surface residuals 104.

Another example surfacing job input 110 that may be a component of the surface status 109 may be the surface age 105, as mentioned above. In this regard, the surface age 105 may be indicated by the year that the surface was originally installed. The surface age 105 may be used as an indicator of the potential degree of decay of the surface. Further, the surface age 105 may also be an indicator of the materials used to construct the surface based on the types of materials that may have been popular for use at the time of original installation of the surface.

Another example surfacing job input 110 that may be a component of the surface status 109 may be the surface material 111. In this regard, the surface material 111 may be an indication of the type of materials that make up the surface. For example, the surface material may be, for example, concrete, cement, stone, or the like. Accordingly, to some example embodiments, the surface material 111 may describe the ingredients, such aggregate and size of aggregate, that was used to initially form the surface.

In addition to those described above, other characteristics may additionally or alternatively be considered as components of the surface status 109. For example, a current surface finishing type may be a component of the surface status 109. In this regard, the current surface finishing type may be an indicator of, for example, the quality of finish or gloss level current surface prior to the surfacing job. According to some example embodiments, the current surface finishing type may be one of, for example, high-gloss, semi-gloss, satin, flat, or the like. Accordingly, the surface status 109 may also include aspects directed to coatings or glosses that may have been applied to the surface.

Further, the surface status 109 may also include a component indicative of the surface aesthetic appearance. In this regard, for example, the surface may include a pigment or other coloring (e.g., green, blue, red, yellow, black, etc.). Additionally or alternatively, an aggregate aesthetic may be included in the surface status 109. In this regard, for example, the aggregate aesthetic may be indicative of the appearance of the surface with respect to any visibility of aggregate (i.e., stones, rocks, or the like). For example, a surface cream aggregate aesthetic may be used where a paste layer is troweled over the surface such that no aggregate is visible after polishing, thereby providing a uniform and consistent color with little or no imperfections. Alternatively, a salt-and-pepper aggregate aesthetic may be present where a fine aggregate is ground to level a top of the stones (e.g., about 2 millimeters of grinding) to expose the top portions of the stones. Alternatively, another aggregate aesthetic may be an exposed aggregate where a visually appealing stone is exposed, for example, at a higher depth than salt-and-pepper (e.g., about 6 millimeters of grinding). As such, a user may input the aggregate aesthetic as, for example, surface cream, salt-and-pepper, or exposed aggregate, as a component of the surface status 109.

According to some example embodiments, the surface status 109 may be provided as job input 110 based on a general look and condition of the surface. In this regard, according to some example embodiments, a parameter for the surface status 109 may be based on, for example, a user selection of an image that most resembles the surface. In this regard, according to some example embodiments, a number of images may be provided to a user for consideration and selection. The user may compare the appears of the surface with the images provided and select the one image that most closely resembles the surface. Alternatively, an image of the surface may be captured by a device, and the device may be configured to compare the image of the surface with a number of images to automatically select an image that most closely resemble the captured image of the surface. Additionally or alternatively, the captured image may be analyzed to identify and determine characteristics of the surface such as material, hardness, roughness, surface residuals, surface age, surface finishing type, or the like, and use such characteristics when developing a consumable product quotation.

The surface environment 106 may be another example job input 110 that may be representative of aspects around or proximate to the surface and may not be a characteristic of the surface itself. The surface environment 106 may be an indicator of whether, for example, the surface is an indoor surface or an outdoor surface. Further, the surface environment 106 may indicate whether the surface is subjected to regular direct sunlight or is shaded, or whether the surface is covered or open such that the surface is subjected to rainfall and other precipitation.

The surface activity 107 may be another example job input 110. In this regard, the surface activity 107 may be an indication of, for example, the amount of foot traffic or vehicle traffic the surface is subjected to on a regular basis. In this regard, the surface activity 107 may have a value that differentiates between, for example, usage of a residential garage surface and a warehouse or retail store surface.

Yet another example job input 110 may be the desired surface finishing type 108. The desired surface finishing type 108 may be an indicator of, for example, the look and quality of finish or gloss level that is desired for the surface as a result of the surfacing job. Further, according to some example embodiments, the desired surface finishing type 108 may also be an indication of the degree of durability for the finish that is desired for the surface. As such, according to some example embodiments, the surface finishing type 108 may be one of, for example, high-gloss, semi-gloss, satin, flat, or the like.

Further, the desired surface finishing type 108 may include a flatness parameter. Flatness, according to some example embodiments, may be a measure of a maximum variation in the plane of the surface over a measurement distance. Flatness may be measured in accordance with measurement standards, such as ASTM (American Society for Testing Materials) E1155, which is the Standard Test Method for Determining Floor Flatness (FF) and Floor Levelness (FL) Numbers. Another standard is the ASTM E1486, which is the Standard Test Method for Determining Floor Tolerance Using Waviness, Wheel Path, and Levelness Criteria. Such methods of measuring may use an F-Number System for describing floor flatness (local surface bumpiness or waviness) and floor levelness (differences in the elevations along measurement lines). In this regard, according to some example embodiments, values, for example, in accordance with the F-Number System, may be provided as input components of the desired surface finishing type 108.

Further, the desired surface finishing type 108 may also include aspects related to the look of, for example, the surface. In this regard, for example, the surface finishing type 108 may include components directed to a pigment or other coloring (e.g., green, blue, red, yellow, black, etc.) that is desired. Additionally or alternatively, an aggregate aesthetic may be included in the desired surface finishing type 108. In this regard, for example, the aggregate aesthetic may be indicative of the appearance of the surface with respect to any visibility of aggregate (i.e., stones, rocks, or the like). As described above, the aggregate aesthetic may be, for example, surface cream, salt-and-pepper, or exposed aggregate. Further, according to some example embodiments, the aggregate aesthetic may be based on a size or diameter of the exposed stones or aggregate. Further, the aggregate aesthetic may be selected by the user as a component of the desired surface finishing type 108.

According to some example embodiments, the desired surface finishing type 108 may be provided as job input 110 based on a general look and condition desired for the surface after the surfacing job is complete. In this regard, according to some example embodiments, the desired surface finishing type 108 may be combination of a number of characteristics of the surface after the surfacing job is complete. In this regard, according to some example embodiments, a number of images may be provided to a user for consideration and selection. A user may select an image with an appearance that most resembles the desired surfacing result. Based on the image selection, a number of characteristics for the completed surface may be determined and provided as inputs for the desire surface finishing type 108. Additionally, according to some example embodiments, the desired surface finish type 108 may be input in association with a commercial product category, such as, for example, the Husqvarna Hiperfloor Premium brand category, the Hiperfloor Industrial brand category, or the like.

Desired quality 112 may be another example job input 110. In this regard, the desired quality may be an indication of the quality of, for example, a cut that is to be made in the surface. In this regard, a high-quality cut may be a thin cut that has little to no chipping to breaking of the surface being cut. According to some example embodiments, the desired quality may be a affected by an amount of water used, a rotation speed, and the type of consumable products used, for example, to complete the cutting job. The desired quality 112 may be associated with performance classes of consumable products. In this regard, the consumable product may have performance levels where the higher performance levels offer better quality outcomes (e.g., cleaner cuts or smoother surfacing), longer utilization lifetimes, or the like. The performance levels may be defined with respect to categories such as, for example, the gold level, the silver level, the bronze level, or the like.

While the above provides some example of the job inputs 110 that may be received by the quotation front end module 215, the following now provides some examples of profile inputs 120 that be received by the quotation front end module 215. In this regard, one profile input 120 may be user identification information 121. In this regard, user identification information 121 may include personal information about the user (name, age, place of employment, etc.). The user identification information 121 may also include a user id or login name for the user.

The profile input 120 may also include a rotary tool identifier 122, which, according to some example embodiments, identify, for example, a model of a rotary surfacing machine, a power cutter, a floor saw, a wire saw, a wall saw, a core drill stand, or the like. As such, the rotary tool identifier 122 may be a model number of a rotary tool that the user has available for use in performing jobs. In this regard, according to some example embodiments, the rotary tool identifier 122 may include model numbers and quantities of a number of rotary tools that a user may have in a fleet of rotary tools that could be used for the job, and in this case, the surfacing job. In this regard, such as fleet may include rotary surfacing machines, wire saws, core drill stands, power cutters, and the like. Further, based on the model of the rotary tools indicated by the rotary tool identifier 122, tool parameters may be determined such as dimensions, operational setting ranges, or the like. The rotary tool identifier 122 may also be used to determine attributes about the rotary tools via a rotary tool database that houses information regarding operating characteristics and options for use with the rotary tool (e.g., water systems and parameters, consumable product attachment types, or the like). In this regard, according to some example embodiments, the attachment type or connection type for consumable products may be a separate input. The means by which a consumable product is attached to a rotary tool may differ based on the rotary tool. In this regard, for example, the attachment types for drill bits to drills, such as those used with a core drill stand, may have a first attachment type in the United States, a different attachment type in Europe, and still a third attachment type in Japan. Further, the attachment types may be indicated by a commercial brand of attachment mechanisms such as Redilock, EZ Change, or the like.

The rotary tool identifier 122 may also be input as a selection from a list of rotary tools and tool configurations (e.g., a default list of tool and configurations). In this regard, for example, with respect to a given rotary tool, a lifetime for the rotary tool may be set as function of the configuration as an expected lifetime of the tool in the particular configuration. As such, according to some example embodiments, based on the expected lifetime of the tool in the particular configuration, the output of the rotary tool recommendation may be adjusted.

Another profile input 120 may be the geographic location 123 of the user or of the jobsite. In this regard, the geographic location 123 may be input by the user or a location sensor (e.g., global positioning system sensor) of, for example, the surfacing quotation front end platform 30 may be used to automatically determine the geographic location 123. As indicated above, the geographic location 123 may be used to make assumptions about, for example, the surface hardness. Additionally, according to some example embodiments, as further explained below, the geographic location 123 may be used as proxy for labor costs. In this regard, since labor costs typically vary by geographic region, the geographic location 123 may be used to determine applicable labor costs and automatically adjust selection of consumable products based on the impact on labor cost (e.g., to offset labor costs for consumable product costs) for the surfacing job. Accordingly, another example profile input 120 may be labor cost 124. In this regard, for example, the user may enter the labor cost (e.g., cost per unit area/distance/time) directly for analysis. According to some example embodiments, the geographic location may also comprise or be associated with a market for the job.

Additionally, another profile input 120 may be the currency 125. In this regard, the currency 125 may be determined automatically based on the geographic location 123. However, according to some example embodiments, the user may be able to directly enter the currency 125 that should be associated with the user's jobs.

As such, the quotation front end module 215 may be configured to receive at least some of these inputs 110 and 120 or other inputs. According to some example embodiments, the quotation front end module 215 may perform some formatting or combining of the inputs. Further, the quotation front end module 215 may be configured to send or transmit at least some these inputs 110 and 120 or other inputs to the quotation back end module 315 (e.g., via the network 40). As such, the quotation back end module 315 may also be configured to receive the job inputs 110 or the profile inputs 120. As such, the quotation front end module 215 may be configured to receive the inputs via a user interface (e.g., user interface 220) or a sensor, while the quotation back end module 315 may be configured to receive the inputs via a communications interface (e.g., communications interface 335).

After having received at least some of the inputs described above, the quotation back end module 315 may be configured to determine consumable product requirements for a job (e.g., surfacing job or cutting job). In this regard, the quotation back end module 315 may be configured to analyze the received inputs and apply the inputs against consumable product parameters 62 in the consumable products database 60 to determine the consumable product requirements.

In this regard, the consumable products database 60 may include comprehensive information regarding consumable product options and the parameters or characteristics of the consumable products. The consumable products database 60 may include information regarding consumable products including grinding consumable products, a chemical treatment consumable products, polishing consumable products, finishing treatment consumable products, and cutting consumable products. Additionally, such consumable products may include drill bits and cutting discs, as well as characteristics and parameters associated with the drill bits and cutting discs such as a diameter, drill bit length, an attachment type, cutting speed/RPM requirements, and the like. Characteristic information regarding the various consumable products may be referred to herein as consumable product parameters 62. In this regard, consumable product parameters 62 may be defined for each of the consumable products listed in the consumable products database 60. Such parameters may include, for example, a consumable type of product (e.g., grinding, chemical treatment, polishing, finishing treatment, cutting, etc.), a consumable product identifier (e.g., product stock keeping unit (SKU)), or a description of the product (e.g., segment, pad, liquid, cutting wire, drill bit, cutting blade, unit size/amount, grit information, etc.). Additionally, the consumable product parameters 62 may include a utilization metric for the product (e.g., utilization area in square feet or meters squared, distance, usable time, etc.) indicating the application area for the product when used properly. Further, the consumable product parameters 62 may include rotary tool compatibility information indicating which rotary tools may be used with the particular consumable product (e.g., based on a size of the rotating base of, for example, the rotary surfacing machines). Additionally, the consumable product parameters 62 may also include a quality rating for each consumable product stored in the consumable products database 60. A product usage time may also be included in the consumable product parameters 62, which may indicate an amount of time, based on the operational settings of the rotary tool, that a product may be utilized before requiring replacement. Further, a product labor cost may be associated with each consumable product within the consumable products database 60 as a consumable product parameter 62, which may be based on the product usage time for a given labor cost rate. Additionally, the consumable product parameters 62 may include operational settings for a rotary tool for the product. In this regard, the operational settings may vary between jobs, based on the job inputs 110 and the profile inputs 120, but the operational settings in the consumable products database 60 may offer a variety of operational settings that may be available for use with the respective product.

As such, the quotation back end module 315 may be configured to determine the consumable product requirements based on an application of at least some of the inputs 110 and 120 in view of the consumable product parameters 62 of the consumable products database 60. In doing so, the quotation back end module 315 may be configured to automatically select consumable products that should be used to obtain the results (e.g., finishing results) desired by the user for the associated job. In this regard, according to some example embodiments, the quotation back end module 315 may be configured to determine consumable product requirements for performing a job based on inputs such as, for example, the jobsite measurement 101, the rotary tool identifier 122, the surface hardness 102, and the surface finishing type 108. Further, the consumable product requirements may be determined based on consumable product parameters 62, which may be accessed in the consumable products database 60.

According to some example embodiments, the quotation back end module 315 may be configured to determine the consumable product requirements based on at least one labor cost threshold. In this regard, if the aggregate product labor costs for a job exceed a labor cost threshold, then, for example, higher quality consumable products may be selected that have lower labor costs (e.g., due to less frequent need to replace the consumable product during, for example, a surfacing process). According to some example embodiments, a higher quality consumable product may have a larger utilization area or usage time, and therefore consumable products of higher quality may need to be replaced less frequently during the job. As such, according to some example embodiments, the quotation back end module 315 may be configured to select consumable products, for example, with a utilization area greater than a utilization area threshold in response to the aggregate labor cost for the job being greater than a labor cost threshold.

Additionally, according to some example embodiments, the quotation back end module 315 may be configured to provide outputs 130 based on the determined consumable product requirements. One output 130 may be a consumable product quotation 132. Alternatively, an output may be the consumable product requirements portion of the consumable product quotation 132. In this regard, using the consumable product requirements, the quotation back end module 315 may be configured to compile the consumable product requirements into the consumable product quotation 132. According to some example embodiments, a consumable product quotation 132 may include information such as types and quantities of consumable products for completing a job based on the inputs provided. In this regard, the consumable product quotation 132 may indicate, for example, the type and quantities in categories based on desired quality or performance class (e.g., gold level, silver level, bronze level, etc.) of the consumable products. As such, a list of suitable consumable products (e.g., drill bits, cutting discs, etc.) may be provided. Further, the consumable product quotation 132 may include a per product cost and an aggregate cost of consumable products for the job. Additionally, the consumable product quotation 132 may indicate a per unit area cost (e.g., per sqft cost or per $m^2$ cost) for the job.

Additionally, the quotation back end module 315 may be configured to incorporate a usage sequence into the consumable product quotation 132. In this regard, the ordering or sequencing of the consumable products in a list provided in the consumable product quotation 132 may be indicative of the sequence in which the user should apply the consumable products of the consumable product quotation 132. In this regard, the consumable products database 60 may include consumable product parameters 62 indicating a sequence position for a given consumable product for use in generating the sequencing within the consumable product quotation 132. The usage sequence may also be indicative of how to complete the job, both with respect to the use of the consumable products and otherwise. In this regard, the usage sequence may be step-by-step instructions for completing job from surface and rotary tool preparation to safety gear to have in place during portions of the job, to job clean up and rotary tool storage.

The quotation back end module 315 may also be configured to determine a time to complete the job. According to some example embodiments, a number of personnel required may also be determined in association with the determined time to complete the job. The time to complete the job may be determined, for example, by the consumable product quotation 132. In this regard, the time to complete the job and the personnel required may be provided in the consumable product quotation 132. The consumable products database 60 may include consumable product parameters 62, such as, for example, the product usage time, which may be utilized to determine the time to complete the job based on the consumable products selected. According to some example embodiments, a labor cost for the jab may be determined based on the time to complete the job.

Further, according to some example embodiments, the quotation back end module 315 may be configured to determine operational settings for the job, which may be included in the consumable product quotation 132. In this regard, the operational settings may be determined for each step of the product application sequence as defined above. In this regard, as different consumable products are installed on the rotary tool (e.g., rotary surfacing machine), the operational settings may be indicated, for example, by the consumable product quotation 132 to allow a user to set the rotary tool (via the user interface 15) for proper operation with the particular consumable products for the particular step in the sequence or allow the rotary tool to perform settings changes automatically. For example, according to some example embodiments, the operational settings for a step of the job may be an indication of a segments or other consumable products that may be used for that step. In this regard, for example, the operational settings may indicate, for example, that for a first step a full set of segments (e.g., 18 segments for 18 positions) may be used and for a second step a half set of segments (e.g., 9 segments for 18 positions) may be used.

Additionally, with respect to the communication of the operational settings, the operational settings may be communicated, according to some example embodiments, to the rotary tool 150 to be uploaded into a memory 20 of the rotary tool 150 for retrieval during operation. In this regard, in this regard, the rotary tool (e.g., the rotary surfacing machine 10), as mentioned above, may include a communications interface (e.g., a wireless communication interface) and be configured to receive operational settings to control the operation of the rotary tool in accordance with a sequence, for example, as provided in the consumable product quotation 132. The rotary tool 150 may be configured to automatically change operational settings (or suggest changes to the settings to the user).

According to some example embodiments, the electronics platform 15 of the rotary tool 150 may comprise a reader device 29 configured to read an RFID tag or other wireless communication tag disposed on the consumable product, when the consumable product is installed on the rotary tool 150. Based on a product identifier provided by the RFID tag or the like, the rotary tool 150 may be configured to determine which step in the job sequence is a current step and automatically change the operational settings (or suggest change of the operational setting to the user) for the rotary tool 150 in accordance with the corresponding step in the sequence provided in the consumable product quotation 132. Note that, according to some example embodiments, the entire consumable product quotation 132 need not be communicated or received by the rotary tool 150. However, according to some example embodiments, the operational settings may be provided to the rotary tool (e.g., the rotary surfacing machine 10).

According to some example embodiments, another output 130 that may be included, for example, in the consumable product quotation 132, may be a rotary tool recommendation or, in the example of FIG. 4, a rotary surfacing machine recommendation. The rotary tool recommendation may be provided to indicate to the user an optimal rotary tool make or model that would be best-suited for the job in association with the consumable products. In this regard, for example, in instances where no rotary tool identifier 122 was provided as an input or if one was provided, a rotary tool recommendation may be provided as an output.

According to some example embodiments, another output 130 may be a rotary tool performance estimate. In this regard, based on factors, such as the surface status 109, a rotary tool performance estimate for a particular rotary tool may be provided. In this regard, a range of rotary tools, e.g., models of rotary tools, may be listed in association with a performance estimate. Rotary tools with higher performance estimates may be better-suited for performing the surfacing or cutting job, while rotary tools with lower performance estimates may be poorly-suited for performing the surfacing or cutting job. According to some example embodiments, the rotary tool performance estimate may be provided with respect to the consumable products. In this regard, the performance estimate may indicate an estimated lifetime of the consumable products during the job. Such an estimated lifetime may be measured in, for example, utilization time, number of holes to be drilled, number of cuts of a given length, or the like.

According to some example embodiments, another output 130 may be a rotary tool physical setup. In this regard, in some instances for cutting jobs, the rotary tool may be required to be affixed in place to perform the job. The rotary tool physical setup may be an indication of the manner in which the rotary tool may be physically set up or affixed to, for example, the surface to be acted upon. For example, with respect to a wire saw, a number of different options may be available for setting up the wire saw for a cutting job, such as, mounted to a pillar or support to be cut, or to an adjacent pillar or support.

Additionally, an output 130 may include accessory equipment that may be necessary or recommended for the job. In this regard, based on the inputs, accessory such as dust collection tools and equipment, safety equipment (e.g., glasses, clothes, gloves, helmets, etc.) may be provided.

Additionally, according to some example embodiments, another output 130 may be a consumable product availability, which may include a link to buy a consumable product or rent a rotary tool. In this regard, an inventory check of the stock of the consumable products in the consumable product requirements may be performed to determine availability. Such availability may be provided in the form of a quantity. Further, according to some example embodiments, a physical store availability, based on the geographic information of the user, may be provided or an e-commerce availability (with purchasing options) may be provided.

Further, in some instances, prior to beginning, for example, a large surfacing job, a customer or the user may wish apply the process using the determined consumable products to small area to preview the expected results for the larger area. To perform such a smaller trial procedure, a starting kit of consumable products may be needed. As such, according to some example embodiments, the quotation back end module 315 may be configured to determine the consumable product requirements for a starting kit and generate a consumable product quotation 132 that includes indication of the consumable products needed for the starting kit. In this regard, for example, the quotation back end module 315 may be configured to provide a starting kit quotation indicating minimum required consumable products for a trial area associated with a job, such as a surfacing or cutting job.

According to some example embodiments, an example consumable product quotation in the form of a surfacing consumable product quotation 140 is provided in FIG. 5. In this regard, it can be seen in the example surfacing consumable product quotation 140 that a job ID and date the quotation was generated may be included. Further, the surface material, the finishing type, the jobsite measurement, the rotary surfacing machine identifier (e.g., the grinding machine model no.), and the currency may be included. Additionally, a tabulation of the surfacing consumable products for the surfacing consumable product quotation may be included in the order in which the surfacing consumable product should be applied or with an indication of the order in which they should be applied (e.g., a usage sequence number). In this regard, the determined surfacing consumable products may be listed with each product's type, description, SKU, and unit price. Additionally, quantities and costs for a starting kit may be provided, as well as, quantities and costs of the determined surfacing consumable products for the full job.

Additionally, having determined the consumable product requirements, the quotation back end module 315 may be configured to provide the consumable product quotation 132 to the quotation front end module 215. In this regard, the quotation front end module 215 may be configured to receive the consumable product quotation 132 from the quotation back end module 315. To provide the consumable product quotation 132 to the quotation front end module 215, the quotation back end module 315 may be configured to transmit the consumable product quotation 132 to the quotation front end module 215 via the network 40. The quotation front end module 215 may, in turn, be configured to output the consumable product quotation 132 to the user via an output device (e.g., a display screen) of the device configured to implement the quotation front end module 215.

Further, either the quotation front end module 215 or the quotation back end module 315 may be configured to take further actions with respect to the consumable product quotation 132. In this regard, according to some example embodiments, the quotation front end module 215 may be configured to permit a user (e.g. user 26) to edit or otherwise modify the consumable product quotation 132 by, for example, replacing a consumable product with another or by applying a discount to the costs provided. Further, either the quotation front end module 215 or the quotation back end module 315 may be configured to store the consumable product quotation 132 in association with the user requesting the consumable product quotation 132. As such, the consumable product quotation 132 may be stored in a memory (e.g., memory 210 or 310) of a device local to the quotation front end module 215 or the quotation back end module 315.

According to some example embodiments, the quotation front end module 215 or the quotation back end module 315 may be configured to send the consumable product quotation 132 to an online posting service (e.g. online posting service 80) or to an account associated with another user. In this regard, the quotation front end module 215 or the quotation back end module 315 may be configured to support sharing of consumable product quotations between users and within an online community.

Additionally, according to some example embodiments, the quotation front end module 215 or the quotation back end module 315 may be configured to send the consumable product quotation 132 to a consumable product e-commerce platform (e.g., consumable product e-commerce platform 70) for a purchasing transaction. In this regard, a user may be able to input payment information and request purchase, and possibly delivery, of the consumable products identified in the consumable product quotation 132.

Additionally, according to some example embodiments, the quotation front end module 215 or the quotation back end module 315 may be configured to determine and send operational settings for the rotary tool (e.g., the rotary surfacing machine) in a consumable product quotation 132. Additionally or alternatively, the quotation front end module 215 or the quotation back end module 315 may be configured to determine and send the operational settings separate from the consumable product quotation 132 to, for example, a rotary tool 150 (e.g., rotary surfacing machine 10). The rotary tool 150 may be configured to receive the operational settings and automatically control the operation of the rotary tool 150 based on the operational settings. Now referring to FIG. 6, an example configuration of the quotation front end platform 30 is provided as a more detailed block diagram. In this regard, quotation front end platform 30 comprises processing circuitry 200. Processing circuitry 200 may, in turn, comprise a processor 205, a memory 210, the quotation front end module 215, a user interface 220, and a communications interface 235. Additionally, the quotation front end platform 30 may include additional components not shown in FIG. 6 and the processing circuitry 200 may be operably coupled to other components of the quotation front end platform 30 that are not shown in FIG. 6.

Further, according to some example embodiments, processing circuitry 200 may be in operative communication with or embody, the memory 210, the processor 205, the user interface 220, and the communications interface 235. Through configuration and operation of the memory 210, the processor 205, the user interface 220, and the communications interface 235, the processing circuitry 200 may be configurable to perform various operations as described herein, including the operations and functionalities described with respect to the quotation front end module 215. In this regard, the processing circuitry 200 may be configured to perform computational processing, memory management, user interface control and monitoring, and manage remote communications, according to an example embodiment. In some embodiments, the processing circuitry 200 may be embodied as a chip or chip set. In other words, the processing circuitry 200 may comprise one or more physical packages (e.g., chips) including materials, components or wires on a structural assembly (e.g., a baseboard). The processing circuitry 200 may be configured to receive inputs (e.g., via peripheral components), perform actions based on the inputs, and generate outputs (e.g., for provision to peripheral components). In an example embodiment, the processing circuitry 200 may include one or more instances of a processor 205, associated circuitry, and memory 210. As such, the processing circuitry 200 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 210 may include one or more non-transitory memory devices such as, for example, volatile or non-volatile memory that may be either fixed or removable. The memory 210 may be configured to store information, data, applications, instructions or the like for enabling, for example, the functionalities described with respect to the surfacing quotation front end module 215. The memory 210 may operate to buffer instructions and data during operation of the processing circuitry 200 to support higher-level functionalities, and may also be configured to store instructions for execution by the processing circuitry 200. The memory 210 may also store various information including job inputs 110, profile inputs 120, or the consumable products database 60. According to some example embodiments, various data stored in the memory 210 may be generated based on other data and stored or the data may be retrieved via the communications interface 235 and stored in the memory 210.

As mentioned above, the processing circuitry 200 may be embodied in a number of different ways. For example, the processing circuitry 200 may be embodied as various processing means such as one or more processors 205 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 200 may be configured to execute instructions stored in the memory 210 or otherwise accessible to the processing circuitry 200. As such, whether configured by hardware or by a combination of hardware and software, the processing circuitry 200 may represent an entity (e.g., physically embodied in circuitry—in the form of processing circuitry 200) capable of performing operations according to example embodiments while configured accordingly. Thus, for example, when the processing circuitry 200 is embodied as an ASIC, FPGA, or the like, the processing circuitry 200 may be specifically configured hardware for conducting the operations described herein. Alternatively, as another example, when the processing circuitry 200 is embodied as an executor of software instructions, the instructions may specifically configure the processing circuitry 200 to perform the operations described herein.

The communication interface 235 may include one or more interface mechanisms for enabling communication with other devices external to the quotation front end platform 30, via, for example, network 40, which may, for example, be a local area network, the Internet, or the like, through a direct (wired or wireless) communication link to another external device, or the like. In some cases, the communication interface 235 may be any means such as a device or circuitry embodied in either hardware, or a combination of hardware and software that is configured to receive or transmit data from/to devices in communication with the processing circuitry 200. The communications interface 235 may be a wired or wireless interface and may support various communications protocols (WIFI, Bluetooth, cellular, or the like).

The user interface 220 may be controlled by the processing circuitry 200 to interact with peripheral components or devices of the surfacing quotation front end platform 30 that can receive inputs from a user 26 or provide outputs to a user 26. In this regard, via the user interface 220, the processing circuitry 200 may be configured to receive inputs from an input device 230 which may be, for example, a touch screen display, a keyboard, a mouse, a microphone, or the like. The user interface 220 may also be configured to provide control and outputs to peripheral devices such as, for example, a display 225 (e.g., a touch screen display), speaker, or the like. The user interface 220 may also produce outputs, for example, as visual outputs on a display, audio outputs via a speaker, or the like.

The quotation front end module 215 may, according to some example embodiments, be circuitry that is part of or a configuration of the processor 205, possibly in combination with the memory 210. As such, the quotation front end module 215 may be configured to cause the processing circuitry 200 to perform various functionalities as a component of the processing circuitry 200. As such, the quotation front end module 215, and thus the processing circuitry 200, may be configured to perform the functionalities described above in the context of the quotation front end platform 30.

Figure 7:
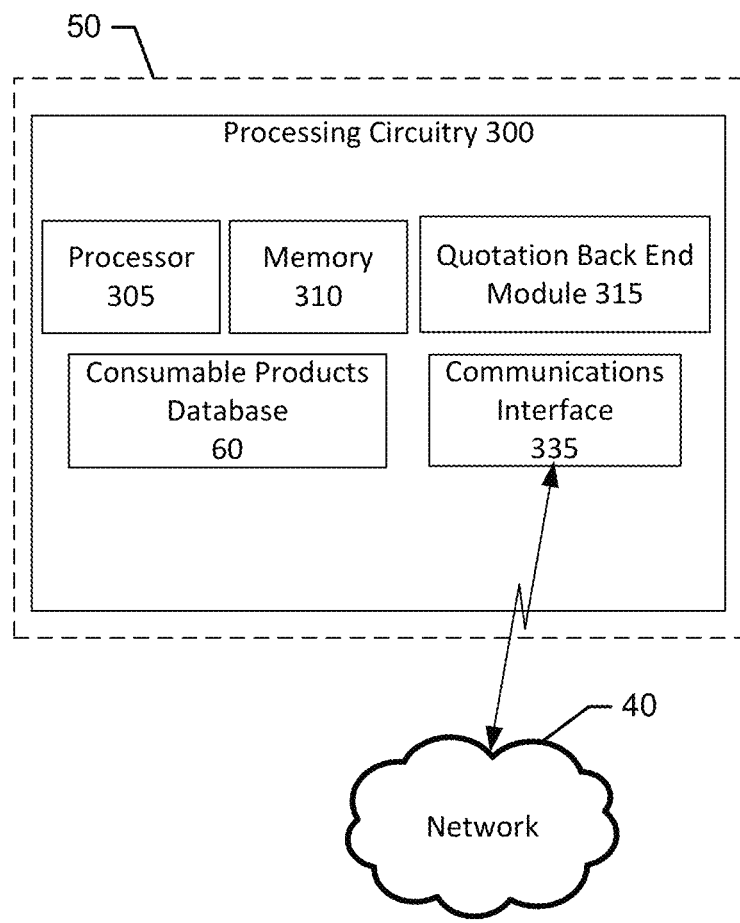
FIG. 7 illustrates an example quotation back end platform for generating a consumable product quotation according to some example embodiments.

Now referring to FIG. 7, an example configuration of the quotation back end platform 50 is provided as a more detailed block diagram. In this regard, quotation back end platform 50 comprises processing circuitry 300. Processing circuitry 300 may, in turn, comprise a processor 305, a memory 310, the quotation back end module 315, and a communications interface 335. Additionally, the quotation back end platform 50 may include additional components not shown in FIG. 7 and the processing circuitry 300 may be operably coupled to other components of the quotation back end platform 50 that are not shown in FIG. 7.

Further, according to some example embodiments, processing circuitry 300 may be in operative communication with or embody, the memory 310, the processor 305, and the communications interface 335. Through configuration and operation of the memory 310, the processor 305, and the communications interface 335, the processing circuitry 300 may be configurable to perform various operations as described herein, including the operations and functionalities described with respect to the quotation back end module 315. In this regard, the processing circuitry 300 may be configured to perform computational processing, memory management, user interface control and monitoring, and manage remote communications, according to an example embodiment. In some embodiments, the processing circuitry 300 may be embodied as a chip or chip set. In other words, the processing circuitry 300 may comprise one or more physical packages (e.g., chips) including materials, components or wires on a structural assembly (e.g., a baseboard). The processing circuitry 300 may be configured to receive inputs (e.g., via peripheral components), perform actions based on the inputs, and generate outputs (e.g., for provision to peripheral components). In an example embodiment, the processing circuitry 300 may include one or more instances of a processor 305, associated circuitry, and memory 310. As such, the processing circuitry 300 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 310 may include one or more non-transitory memory devices such as, for example, volatile or non-volatile memory that may be either fixed or removable. The memory 310 may be configured to store information, data, applications, instructions or the like for enabling, for example, the functionalities described with respect to the quotation back end module 315. The memory 310 may operate to buffer instructions and data during operation of the processing circuitry 300 to support higher-level functionalities, and may also be configured to store instructions for execution by the processing circuitry 300. The memory 310 may also store various information including job inputs 110, profile inputs 120, or the consumable products database 60. According to some example embodiments, various data stored in the memory 310 may be generated based on other data and stored or the data may be retrieved via the communications interface 335 and stored in the memory 310.

As mentioned above, the processing circuitry 300 may be embodied in a number of different ways. For example, the processing circuitry 300 may be embodied as various processing means such as one or more processors 205 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 300 may be configured to execute instructions stored in the memory 310 or otherwise accessible to the processing circuitry 300. As such, whether configured by hardware or by a combination of hardware and software, the processing circuitry 300 may represent an entity (e.g., physically embodied in circuitry—in the form of processing circuitry 300) capable of performing operations according to example embodiments while configured accordingly. Thus, for example, when the processing circuitry 300 is embodied as an ASIC, FPGA, or the like, the processing circuitry 300 may be specifically configured hardware for conducting the operations described herein. Alternatively, as another example, when the processing circuitry 300 is embodied as an executor of software instructions, the instructions may specifically configure the processing circuitry 300 to perform the operations described herein.

The communication interface 335 may include one or more interface mechanisms for enabling communication with other devices external to the quotation back end platform 50, via, for example, network 40, which may, for example, be a local area network, the Internet, or the like, through a direct (wired or wireless) communication link to another external device, or the like. In some cases, the communication interface 235 may be any means such as a device or circuitry embodied in either hardware, or a combination of hardware and software that is configured to receive or transmit data from/to devices in communication with the processing circuitry 300. The communications interface 335 may be a wired or wireless interface and may support various communications protocols (WIFI, Bluetooth, cellular, or the like).

The quotation back end module 315 may, according to some example embodiments, be circuitry that is part of or a configuration of the processor 305, possibly in combination with the memory 310. As such, the quotation back end module 315 may be configured to cause the processing circuitry 300 to perform various functionalities as a component of the processing circuitry 300. As such, the quotation back end module 315, and thus the processing circuitry 300, may be configured to perform the functionalities described above in the context of the quotation back end platform 50.

Figure 8:
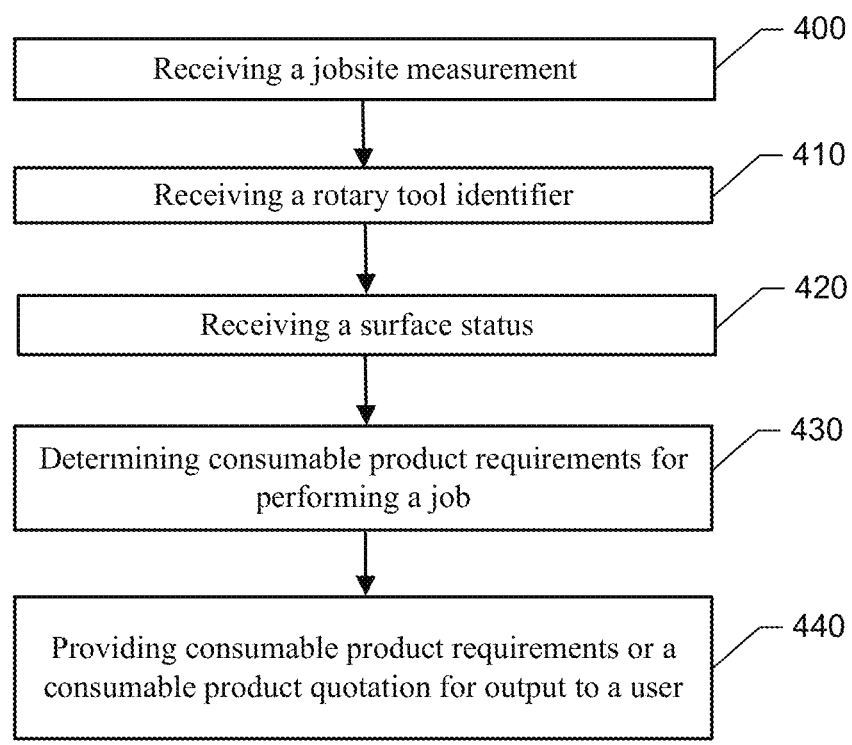
FIG. 8 illustrates a block diagram flowchart of an example method for generating a consumable product quotation according to an example embodiment.

Now with reference to the flow chart of FIG. 8, an example method for generating and providing consumable product requirements or a consumable product quotation is provided. According to some example embodiments, the example methods described below may be implemented on or by processing circuitry (e.g., processing circuitry 200 or 300). In this regard, such processing circuitry may be configured to implement the example methods in accordance with the functionalities described with respect to the quotation front end module 215 or the quotation back end module 315.

In this regard, the example method may comprise, according to some example embodiments, receiving a jobsite measurement at 400, receiving a rotary tool identifier at 410, and receiving a surface status at 420. The example method may also comprise, at 430, determining consumable product requirements for performing a job. According to some example embodiments, the consumable product requirements may be determined based on one or more of the jobsite measurement, the rotary tool identifier, the surface status, a surface finishing type, or consumable product parameters. In this regard, the consumable product parameters may be accessed in a consumable products database. Further, at 440, the example method may comprise providing the consumable product requirements, or a consumable product quotation, based on the consumable product requirements, for output to a user, for example, via a user interface. The consumable product quotation may comprise types and, according to some example embodiments, quantities of consumable products for the job.

Additionally, according to some example embodiments, the operation of determining the consumable product requirements may include determining the consumable product requirements based on a geographic location of a user. Additionally or alternatively, the example method may further comprise receiving a surface finishing type and determining the consumable product requirements based on the surface finishing type. Additionally or alternatively, the operation of determining the consumable product requirements may include determining the consumable product requirements based a labor cost associated with a geographic location of a user. Additionally or alternatively, the operation of determining the consumable product requirements may also include determining the consumable product requirements based on at least one labor cost threshold. Additionally or alternatively, determining the consumable product requirements may be based on the surface status, where the surface status comprises surface roughness. Additionally or alternatively, the example method may include determining a time to complete the surfacing job based on the determined consumable product requirements, and an associated labor cost based on the time to complete the surfacing job. Additionally or alternatively, determining the consumable product requirements includes determining the consumable product requirements based on a rotary surfacing tool identifier. Additionally or alternatively, determining the consumable product requirements includes determining the consumable product requirements based on consumable product parameters comprising a utilization area for a consumable product. Additionally or alternatively, the operation of determining the consumable product requirements may include determining the consumable product requirements based a labor cost, and the example method may further comprises determining the consumable product requirements by selecting consumable products, for inclusion in the consumable product requirements, with a utilization area greater than a utilization area threshold in response to the labor cost being greater than a labor cost threshold. Additionally or alternatively, the example method may further comprise providing a sequence in which consumable products within the consumable product requirements or the consumable product quotation are to be applied for the surfacing job. Additionally or alternatively, the example method may further comprise sending the consumable product requirements or the consumable product quotation to a consumable product e-commerce platform for a purchasing transaction.

Additionally or alternatively, the determined consumable product requirements may comprise grinding consumable products, a chemical treatment consumable products, polishing consumable products, and finishing treatment consumable products. Additionally or alternatively, the example method may comprise storing the consumable product quotation in association with a user requesting the consumable product quotation. Additionally or alternatively, the example method may further comprise sending the consumable product requirements or the consumable product quotation to an online posting service or to an account associated with another user. Additionally or alternatively, the example method may further comprise providing a starting kit quotation indicating minimum required consumable products for a trial area associated with the surfacing job for output to a user. Additionally or alternatively, the example method may comprise determining operational settings for a rotary surfacing machine based on the consumable product requirements, and transmitting the operational settings to the rotary surface machine for use in performing the surfacing job. Additionally or alternatively, the example method may comprise receiving a surfacing job site measurement and determining the consumable product requirements based on the surfacing job site measurement. In this regard, the consumable product requirements may include quantities of consumable products for the surfacing job.

As used herein, the term "module" is intended to include a computer-related entity, such as but not limited to hardware, software, or a combination of hardware and software. For example, a module may be, but is not limited to being a software or hardware implementation of a process, an object, an executable, and/or a thread of execution, which may be implemented via a processor or computer. By way of example, both an application running on a computing device and/or the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although such examples are described in terms of separate modules corresponding to various functions performed, some examples need not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular entity that is specifically configured in, or can be operably coupled to, processing circuitry to modify the behavior and/or capability of the processing circuitry based on the hardware and/or software that is added to or otherwise operably coupled to the processing circuitry to configure the processing circuitry accordingly.

Many modifications to the example embodiment provided herein, as well as other example embodiments, will come to mind to one skilled in the art to which these example embodiments pertain having the benefit of the teachings presented in the foregoing descriptions and the associated drawings. Therefore, it is to be understood that the example embodiments are not to be limited to the specific ones disclosed and that modifications and other embodiments are intended to be included within the scope. Moreover, although the foregoing descriptions and the associated drawings describe example embodiments in the context of certain example combinations of elements or functions, it should be appreciated that different combinations of elements or functions may be provided by alternative embodiments without departing from the scope. In this regard, for example, different combinations of elements or functions than those explicitly described above are also contemplated. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A system comprising a rotary tool and an apparatus, the rotary tool comprising a rotary tool communications interface and the apparatus comprising an apparatus communications interface, the apparatus further comprising processing circuitry configured to:

receive a surface status;

determine consumable product requirements for performing a job based on the surface status and consumable product parameters accessed in a consumable products database; and provide the consumable product requirements for output to a user, the consumable product requirements comprising consumable products for performing the job, at least one of the consumable products being configured for installation on the rotary tool;

wherein the apparatus further comprises a location sensor configured to determine a geographic location of the apparatus and provide location information indicating the geographic location of the apparatus; and wherein the processing circuitry is further configured to:

determine the consumable product requirements based on the geographic location as indicated by the location information from the location sensor; and transmit information relating to the consumable product requirements from the apparatus communications interface to the rotary tool communications interface for use by the rotary tool during performance of the job;

wherein the rotary tool is configured to drive at least one rotary element of the rotary tool in accordance with operational settings determined based on the information relating to the consumable product requirements, the operational settings including a rotational speed for operating the rotary tool for the job.

2. The system of claim 1 wherein the processing circuitry is further configured to determine the consumable product requirements based on a labor cost associated with the geographic location indicated by the location information.

3. The system of claim 1 wherein the processing circuitry is further configured to determine the consumable product requirements based on at least one labor cost threshold.

4. The system of claim 1 wherein the processing circuitry is further configured to determine consumable product requirements based on a surface finishing type.

5. The system of claim 1 wherein the processing circuitry is further configured to determine a time to complete the job based on the determined consumable product requirements, and an associated labor cost based on the time to complete the job.

6. The system of claim 1 wherein the processing circuitry is further configured to receive a rotary tool identifier and determine the consumable product requirements based on the rotary tool identifier.

7. The system of claim 1 wherein the rotary tool comprises a rotary surfacing machine, a wire saw, a core drill stand, a power cutter, or a floor saw.

8. The system of claim 1 wherein the processing circuitry is further configured to provide a sequence in which consumable products within the consumable product requirements are to be applied for the job.

9. The system of claim 1 wherein the processing circuitry is further configured to send a consumable product quotation, via a communications network, to a consumable product e-commerce platform to perform a purchasing transaction to purchase the consumable products indicated in the consumable product requirements for the job.

10. The system of claim 1 wherein the processing circuitry is further configured to:

determine the operational settings for the rotary tool based on the consumable product requirements; and
transmit the operational settings to the rotary tool for use by the rotary tool during performance of the job.

11. The system of claim 1 wherein the processing circuitry is further configured to receive a job site measurement and determine the consumable product requirements based on the job site measurement, the consumable product requirements including quantities of the consumable products for the job.

12. The system of claim 1 wherein the processing circuitry is further configured to receive data indicative of a surface material for the job and a job measurement in the form of a hole diameter for a hole to be cut; and
wherein the consumable product requirements comprise one or more drill bits for completing the job based on the surface material and the job measurement.

13. The system of claim 1 wherein the processing circuitry is further configured to receive data indicative of a surface material for the job and a job measurement in the form of a slot length for a slot to be cut; and
wherein the consumable product requirements comprise one or more cutting discs for completing the job based on the surface material and the job measurement.

14. The system of claim 1 wherein the processing circuitry is further configured to receive data indicative of a surface material for the job and a job measurement in the form of a surfacing area; and
wherein the consumable product requirements comprise one or more grinding segments or grinding pads for completing the job based on the surface material and the job measurement.

15. A method comprising:
receiving a surface status;
determining, via a location sensor of an apparatus, a geographic location of the apparatus and providing location information indicating the geographic location of the apparatus;
determining, by processing circuitry, consumable product requirements for performing a job based on the surface status, the geographic location of a user as indicated by location information from a location sensor, and consumable product parameters accessed in a consumable products database;
providing the consumable product requirements for output to a user, at least one of consumable products indicated by the consumable product requirements being configured for installation on a rotary tool;
transmitting information relating to the consumable product requirements from an apparatus communications interface to a rotary tool communications interface of the rotary tool for use by the rotary tool during performance of the job;
wherein the rotary tool is configured to drive at least one rotary element of the rotary tool in accordance with operational settings determined based on the information relating to the consumable product requirements, the operational settings including a rotational speed for operating the rotary tool for the job.

16. The method of claim 15 wherein determining the consumable product requirements includes determining the consumable product requirements based on at least one labor cost threshold.

17. The method of claim 15 further comprising determining a time to complete the job based on the determined consumable product requirements and an associated labor cost based on the time to complete the job.

18. The method of claim 15 further comprising providing a sequence in which consumable products within the consumable product requirements are to be applied for the job.

19. The method of claim 15 further comprising sending the consumable product requirements to a consumable product e-commerce platform for a purchasing transaction.

20. A system comprising:
a rotary tool comprising:
a motor;
at least one rotating element driven by the motor, the at least one rotating element configured to receive a consumable product for acting upon a surface for a job; and
a rotary tool communications interface; and
a user terminal comprising processing circuitry and a user terminal communications interface, the processing circuitry configured to:
receive a surface status, the surface status being based on at least one characteristic of a floor surface including a surface material;
determine consumable product requirements for performing a job based on the surface status and consumable product parameters accessed in a consumable products database, the job being a surfacing or cutting job for the rotary tool; and
transmit information relating to the consumable product requirements from the user terminal communications interface to the rotary tool communication interface for use by the rotary tool during performance of the surfacing job;
wherein the rotary tool is configured to drive the at least one rotary element in accordance with operational settings determined based on the consumable product requirements, the operational settings including a rotational speed for operating the rotary tool for the surfacing job.

21. The system of claim 20 wherein the surface status is based on a plurality of characteristics of the floor surface further comprising surface hardness, surface roughness, and surface age; and
wherein the operational settings include at least one of forward speed, planetary rotation speed, satellite rotation speed, weight, or water output rate.

22. The system of claim 20 wherein the rotary tool comprises a user interface configured to display the operational settings to a user of the rotary tool.

23. An apparatus comprising:
an apparatus communications interface;
a location sensor configured to determine a geographic location of the apparatus and provide location information indicating the geographic location of the apparatus; and
processing circuitry configured to:
receive the location information and determine a surface status based on the location information;
determine consumable product requirements for performing a job based on the surface status and consumable product parameters accessed in a consumable products database;
provide the consumable product requirements for output to a user, the consumable product requirements comprising consumable products for performing the job, at least one of the consumable products indicated by the consumable product requirements being configured for installation on a rotary tool; and
transmit information relating to the consumable product requirements from the apparatus communications interface to a rotary tool communications interface for use by the rotary tool during performance of the job;

wherein the rotary tool is configured to drive at least one rotary element of the rotary tool in accordance with operational settings determined based on the information relating to the consumable product requirements, the operational settings including a rotational speed for operating the rotary tool for the job.

* * * * *